US012338414B2

(12) United States Patent
Lundberg et al.

(10) Patent No.: US 12,338,414 B2
(45) **Date of Patent: *Jun. 24, 2025**

(54) CONCENTRATED 2 IN 1 DISHMACHINE DETERGENT AND RINSE AID

(71) Applicant: ECOLAB USA INC., Saint Paul, MN (US)

(72) Inventors: Steven Lundberg, Saint Paul, MN (US); Monique Roerdink Lander, Saint Paul, MN (US)

(73) Assignee: ECOLAB USA INC., Saint Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/409,548

(22) Filed: Jan. 10, 2024

(65) Prior Publication Data

US 2024/0150675 A1 May 9, 2024

Related U.S. Application Data

(63) Continuation of application No. 18/051,776, filed on Nov. 1, 2022, now Pat. No. 11,905,493, which is a (Continued)

(51) Int. Cl.

*C11D 1/72* (2006.01)
*B08B 3/04* (2006.01)

(Continued)

(52) U.S. Cl.

CPC ................ *C11D 3/10* (2013.01); *C11D 1/722* (2013.01); *C11D 3/225* (2013.01); *C11D 3/33* (2013.01);

(Continued)

(58) Field of Classification Search

CPC ............. C11D 1/72; C11D 1/722; C11D 3/10; C11D 3/22; C11D 3/227; C11D 3/33;

(Continued)

(56) References Cited

U.S. PATENT DOCUMENTS 3,048,548 A 8/1962 Martin et al.
3,334,147 A 8/1967 Brunelle et al.

(Continued)

FOREIGN PATENT DOCUMENTS

CN 101514315 A 8/2009
CN 105861192 * 8/2016 ............. A47L 15/00

(Continued)

OTHER PUBLICATIONS

International Search Report and Written Opinion in PCT/US2024/023267, mailed Jul. 12, 2024, 16 pages.

(Continued)

*Primary Examiner* — Brian P Mruk

(74) *Attorney, Agent, or Firm* — McKee, Voorhees & Sease, PLC

(57) ABSTRACT

Consumer and industrial 2-in-1 cleaning compositions providing both detergency and rinseability in a single cleaning composition are disclosed. Alkaline-based cleaning compositions containing a surface modification polymer and an alcohol alkoxylate nonionic surfactant, and methods of using the same provide user-friendly, solid, detergent compositions without the need for using a separate rinse aid composition.

20 Claims, 7 Drawing Sheets

Related U.S. Application Data continuation of application No. 16/948,616, filed on Sep. 25, 2020, now Pat. No. 11,518,961.

(60) Provisional application No. 62/906,781, filed on Sep. 27, 2019.

(51) Int. Cl.

| | |
|---|---|
| ***C11D 1/722*** | (2006.01) |
| ***C11D 3/10*** | (2006.01) |
| ***C11D 3/22*** | (2006.01) |
| ***C11D 3/33*** | (2006.01) |
| ***C11D 3/37*** | (2006.01) |

(52) U.S. Cl.
CPC .......... *C11D 3/3761* (2013.01); *C11D 3/3796* (2013.01)

(58) Field of Classification Search
CPC ....... C11D 3/37; C11D 3/3761; C11D 3/3769; C11D 3/3796; B08B 3/04
See application file for complete search history.

(56) References Cited

U.S. PATENT DOCUMENTS

| | | | |
|---|---|---|---|
| 3,442,242 | A | 5/1969 | Laskey et al. |
| 3,929,678 | A | 12/1975 | Laughlin et al. |
| 4,233,171 | A | 11/1980 | McLaughlin et al. |
| 4,320,026 | A | 3/1982 | Cristobal et al. |
| 4,618,914 | A | 10/1986 | Sato et al. |
| 4,782,901 | A | 11/1988 | Phelps et al. |
| 4,830,773 | A | 5/1989 | Olson |
| 5,364,551 | A | 11/1994 | Lentsch et al. |
| 5,486,316 | A | 1/1996 | Bershas et al. |
| 5,612,305 | A | 3/1997 | Lewis |
| 5,854,189 | A | 12/1998 | Kruse et al. |
| 5,876,514 | A | 3/1999 | Rolando et al. |
| 5,981,456 | A | 11/1999 | Tartakovsky et al. |
| 5,990,066 | A | 11/1999 | Gordon et al. |
| 6,034,044 | A | 3/2000 | Scheper et al. |
| 6,239,091 | B1 | 5/2001 | Tartakovsky et al. |
| 6,462,007 | B1 | 10/2002 | Pieroni et al. |
| 6,486,117 | B1 | 11/2002 | Painter et al. |
| 6,548,472 | B1 | 4/2003 | Drapier et al. |
| 6,548,473 | B1 | 4/2003 | Jacques Kamiel Thoen et al. |
| RE38,262 | E | 10/2003 | Rolando et al. |
| 6,718,991 | B1 | 4/2004 | Breyer et al. |
| 6,827,795 | B1 | 12/2004 | Kasturi et al. |
| 7,041,628 | B2 | 5/2006 | Sunder et al. |
| 7,537,705 | B2 | 5/2009 | Mizuno et al. |
| 8,541,357 | B2 | 9/2013 | Mukherjee et al. |
| 8,574,374 | B2 | 11/2013 | Hueffer et al. |
| 8,888,924 | B2 | 11/2014 | Silvernail et al. |
| 9,127,235 | B2 | 9/2015 | Silvernail et al. |
| 9,127,236 | B2 | 9/2015 | Silvernail et al. |
| 9,624,455 | B2 | 4/2017 | Labarre et al. |
| 9,796,947 | B2 | 10/2017 | Roerdink Lander et al. |
| 9,938,489 | B2 | 4/2018 | Tuerk et al. |
| 9,969,959 | B2 | 5/2018 | Roerdink Lander et al. |
| 10,351,803 | B2 | 7/2019 | Martinez-Crowley et al. |
| 10,392,584 | B2 | 8/2019 | Roerdink Lander et al. |
| 10,501,708 | B2 | 12/2019 | Roerdink Lander et al. |
| 10,851,331 | B2 | 12/2020 | Gelderman et al. |
| 11,905,493 | B2 * | 2/2024 | Lundberg ................. C11D 1/72 |
| 2002/0035049 | A1 | 3/2002 | Suri et al. |
| 2002/0179124 | A1 | 12/2002 | Van Hauwermeiren et al. |
| 2003/0144172 | A1 | 7/2003 | Weuthen et al. |
| 2004/0005990 | A1 | 1/2004 | Aubay et al. |
| 2004/0072715 | A1 | 4/2004 | Griese et al. |
| 2004/0106534 | A1 | 6/2004 | Nitsch et al. |
| 2004/0167049 | A1 | 8/2004 | Kessler et al. |
| 2004/0254090 | A1 | 12/2004 | Lentsch et al. |
| 2004/0259748 | A1 | 12/2004 | Wiedemann et al. |
| 2005/0130868 | A1 | 6/2005 | Evans et al. |
| 2005/0153862 | A1 | 7/2005 | Lau et al. |
| 2006/0046951 | A1 | 3/2006 | Penninger et al. |
| 2006/0069004 | A1 | 3/2006 | Song et al. |
| 2006/0090779 | A1 | 5/2006 | Sharma et al. |
| 2006/0199750 | A1 | 9/2006 | Berger et al. |
| 2007/0017553 | A1 | 1/2007 | Neplenbroek et al. |
| 2007/0082836 | A1 | 4/2007 | Both et al. |
| 2007/0232517 | A1 | 10/2007 | Evans et al. |
| 2007/0244025 | A1 | 10/2007 | Timmann et al. |
| 2008/0280806 | A1 | 11/2008 | Bartelme et al. |
| 2008/0293615 | A1 | 11/2008 | Kieffer et al. |
| 2009/0165821 | A1 | 7/2009 | Gentschev et al. |
| 2009/0192064 | A1 | 7/2009 | Geret et al. |
| 2010/0065090 | A1 | 3/2010 | Tropsch |
| 2010/0081598 | A1 | 4/2010 | Sharma et al. |
| 2010/0139705 | A1 | 6/2010 | Oberlander |
| 2010/0154831 | A1 | 6/2010 | Neplenbrock et al. |
| 2010/0160204 | A1 | 6/2010 | Zipfel et al. |
| 2010/0222247 | A1 | 9/2010 | Zipfel et al. |
| 2010/0311633 | A1 | 12/2010 | Johnson et al. |
| 2011/0073802 | A1 | 3/2011 | Haag et al. |
| 2011/0180112 | A1 | 7/2011 | Silvernail et al. |
| 2011/0232691 | A1 | 9/2011 | Neplenbroek et al. |
| 2011/0232692 | A1 | 9/2011 | Zipfel et al. |
| 2012/0053110 | A1 | 3/2012 | Kiesel et al. |
| 2012/0097193 | A1 | 4/2012 | Rossetto et al. |
| 2012/0142576 | A1 | 6/2012 | Bartleme et al. |
| 2012/0149628 | A1 | 6/2012 | Tjelta et al. |
| 2012/0167922 | A1 | 7/2012 | Sendor-Muller et al. |
| 2012/0190607 | A1 | 7/2012 | Olson et al. |
| 2012/0225943 | A1 | 9/2012 | Gohl et al. |
| 2012/0231990 | A1 | 9/2012 | Besse et al. |
| 2012/0240961 | A1 | 9/2012 | Denome et al. |
| 2012/0291815 | A1 | 11/2012 | Monsrud et al. |
| 2012/0318303 | A1 | 12/2012 | Miralles et al. |
| 2012/0329700 | A1 | 12/2012 | Silvernail et al. |
| 2013/0035277 | A1 | 2/2013 | Silvernail et al. |
| 2013/0074875 | A1 | 3/2013 | Neplenbroek et al. |
| 2013/0130964 | A1 | 5/2013 | Besse et al. |
| 2013/0243661 | A1 | 9/2013 | Baratta et al. |
| 2013/0284210 | A1 | 10/2013 | Hueffer et al. |
| 2014/0031273 | A1 | 1/2014 | Walters et al. |
| 2014/0053876 | A1 | 2/2014 | Silvernail et al. |
| 2014/0378365 | A1 | 12/2014 | Oberlander |
| 2015/0096130 | A1 | 4/2015 | Bullock et al. |
| 2015/0105314 | A1 | 4/2015 | Walters et al. |
| 2015/0119311 | A1 | 4/2015 | Catlin et al. |
| 2015/0141318 | A1 | 5/2015 | Kiesel et al. |
| 2015/0152369 | A1 | 6/2015 | Ronco et al. |
| 2015/0166935 | A1 | 6/2015 | Gardner, Jr. et al. |
| 2015/0252295 | A1 | 9/2015 | Roerdink Lander et al. |
| 2015/0252296 | A1 | 9/2015 | Roerdink Lander et al. |
| 2016/0289605 | A1 | 10/2016 | Dotzauer et al. |
| 2017/0298304 | A1 | 10/2017 | Vesterager |
| 2017/0355929 | A1 | 12/2017 | Letzelter et al. |
| 2018/0105766 | A1 | 4/2018 | Caparros Casco |
| 2018/0201876 | A1 | 7/2018 | Garcia Marcos et al. |
| 2018/0282665 | A1 | 10/2018 | Mansergh et al. |
| 2018/0312787 | A1 | 11/2018 | Gelderman et al. |
| 2021/0040422 | A1 | 2/2021 | Gelderman et al. |
| 2021/0095227 | A1 | 4/2021 | Lundberg et al. |
| 2021/0155873 | A1 | 5/2021 | Gelderman et al. |
| 2021/0355413 | A1 | 11/2021 | Foster et al. |
| 2021/0395644 | A1 | 12/2021 | Olson et al. |
| 2022/0235295 | A1 | 7/2022 | Olson et al. |

FOREIGN PATENT DOCUMENTS

| | | | | |
|---|---|---|---|---|
| CN | 105861192 | A | 8/2016 | |
| DE | 19732689 | A | 2/1999 | |
| DE | 20014919 | U1 | 11/2000 | |
| EP | 0110731 | A2 | 6/1984 | |
| EP | 0687720 | A2 | 12/1995 | |
| EP | 1103599 | B1 | 5/2001 | |
| EP | 1491621 | A1 | 12/2004 | |
| EP | 1550710 | A1 | 7/2005 | |
| EP | 1882439 | A1 | 1/2008 | |
| EP | 2392639 | * | 12/2011 | ............ C11D 17/00 |
| EP | 2392639 | A1 | 12/2011 | |

(56) References Cited

FOREIGN PATENT DOCUMENTS

| | | | |
|---|---|---|---|
| EP | 2754708 | A1 | 7/2014 |
| EP | 239639 | B1 | 1/2018 |
| EP | 3502224 | A1 | 6/2019 |
| GB | 1444863 | A | 8/1976 |
| JP | 2007131659 | A | 5/2007 |
| JP | 2007169473 | A | 7/2007 |
| JP | 2012188586 | A | 10/2012 |
| JP | 2013237792 | A | 11/2013 |
| JP | 2017020017 | A | 1/2017 |
| WO | 9935225 | A2 | 7/1999 |
| WO | 199947631 | A1 | 9/1999 |
| WO | 2000020546 | A1 | 4/2000 |
| WO | 2008021971 | A1 | 2/2008 |
| WO | 2008147940 | A2 | 12/2008 |
| WO | 2011128672 | A2 | 10/2011 |
| WO | 2012042001 | A1 | 4/2012 |
| WO | 2012098177 | A1 | 7/2012 |
| WO | 2012153143 | A2 | 11/2012 |
| WO | 2017013159 | A1 | 1/2017 |
| WO | 2017013161 | A1 | 1/2017 |
| WO | 2018077649 | A1 | 5/2018 |

OTHER PUBLICATIONS

Bayley, C. H., et al., "The Influence of Sodium Carboxymethyl Cellulose on the Suspending Power of Built Soap Solutions", Textile Research Journal, pp. 510-513. Jul. 1950.

Fan et al., "Study on formulation and process of low-density concentrated laundry powder," Detergents & Cosmetics, vol. 33, No. 4, pp. 27-30, Apr. 2010.

Khan et al., "Interaction Between Aqueous Solutions of Polymer and Surfactant and its Effect on Physicochemical Properties", Asia-Pacific Journal of Chemical Engineering, vol. 3, Issue 5: pp. 579-585. Oct. 13, 2008.

Linfield et al., "Development of a Phosphate-Free Home Laundry Detergent", Journal of the American Oil Chemists' Society, vol. 49, pp. 254-258. Apr. 1972.

Lovecarrie1, "No., you haven't! or have you . . . ? : Have your cake and Eat It!" Excite Blog, Retrieved from Internet: <URL: https://shoemad.exblog.jp/8034993>, 6 pages, Jan. 20, 2008.

SafePack, Diversey, 2 pages, Nov. 2011.

Simplify Your Dishwashing, Diversey, 2 pages, retrieved Feb. 24, 2014.

Suma Combi Introduction Video, Diversey, 3 pages, retrieved Feb. 24, 2014.

Suma Revoflow, Diversey, 2 pages, retrieved Feb. 24, 2014.

Jandera et al., "Investigation of chromatographic behaviour of ethoxylated alcohol surfactants in normal-phase and reversed-phase systems using high performance liquid chromatography-mass spectrometry," Journal of Chromatography A, vol. 813, pp. 299-311, 1998.

International Searching Authority in connection with PCT/US2020/052700 filed Sep. 25, 2020, "The International Search Report and the Written Opinion of the International Searching Authority, or the Declaration", 13 pages, mailed Jan. 12, 2021.

* cited by examiner

CONCENTRATED 2 IN 1 DISHMACHINE DETERGENT AND RINSE AID

CROSS REFERENCE TO RELATED APPLICATION

This application is a Continuation Application of U.S. Ser. No. 18/051,776, filed Nov. 1, 2022, now U.S. Pat. No. 11,905,493, issued Feb. 20, 2024, which is a continuation of U.S. Ser. No. 16/948,616, filed Sep. 25, 2020, now U.S. Pat. No. 11,518,961, issued Dec. 6, 2022, which claims priority under 35 U.S.C. § 119 to Provisional Application Ser. No. 62/906,781, filed Sep. 27, 2019. Provisional Application Ser. No. 62/906,781 is herein incorporated by reference in its entirety.

FIELD OF THE INVENTION

The invention relates to 2-in-1 cleaning compositions providing both detergency and rinse aid efficacy in a single cleaning composition. In particular, compositions and methods of using the same provide a user-friendly, solid, detergent composition without the need for using a separate rinse aid composition and which are suitable for consumer and industrial applications.

BACKGROUND OF THE INVENTION

Alkaline detergents are used extensively to clean articles in both consumer and industrial dish machines. Alkaline detergents are extensively used because of their ability to remove and emulsify fatty, oily, hydrophobic soils. However, alkaline detergents have the disadvantage of requiring a rinse aid to prevent the formation of films on glass and other substrate surfaces contacted by the alkaline detergent. Filming is caused in part by using alkaline detergents in combination with certain water types (including hard water), and water temperatures. A solution to the generation of hard water films has been to employ rinse aids to remove such films. However, the need for rinse aids increases the cost associated with alkaline detergents for both the formulation of the cleaning compositions as well as the additional costs associated with heated water for rinsing steps.

Additionally, rinse aids are used in a rinse cycle following the wash cycle to enhance drying time, as well as reduce any cleaning imperfections (including the removal of films). Additional benefits and methods of using rinse aids are described in U.S. Pat. No. RE 38262, which is herein incorporated by reference in its entirety. The addition of rinse aids to a ware wash rinse cycle requires use of GRAS (generally recognized as safe) ingredients as well as wall space for the installation of both a detergent dispenser and a rinse aid dispenser.

Conventional machine warewash in the industrial space utilizes two products to achieve clean, dry, spot free ware: detergent and rinse aid. These two products are distinct in that typically the detergent is dispensed in the wash step and the rinse aid during the rinse step. Industrial undercounter warewash machines are typically used in kitchens where space is limited meaning there is little space for chemistry and it is typically stored on the floor. This presents a major safety hazard in a high traffic area of the kitchen.

There is a need for alternative, effective cleaning compositions that provide the desired cleaning results and at the same time reduce the number of components required for cleaning and rinsing.

It is an objective to develop an alkaline detergent composition that provides good cleaning performance and good rinseability without requiring a rinse aid composition or separate step to employ a rinse aid in the rinse cycle.

A further objective is to provide a carbonate-based alkaline detergent employing a combination of a surface modification polymer and an alcohol alkoxylate surfactant, builders and water conditioning polymer, to provide good cleaning performance and rinseability without the use of a rinse aid in the cleaning composition.

A further objective is to provide a solid ware wash detergent and rinse aid 2-in-1 composition that is non-spilling, PPE free, high performing, and dispensable.

Other objects, advantages and features of the present invention will become apparent from the following specification taken in conjunction with the accompanying drawings.

BRIEF SUMMARY OF THE INVENTION

In an embodiment, an alkaline detergent and rinsing composition comprises: an alkalinity source; a surface modification polymer; an alcohol alkoxylate nonionic surfactant; a builder; and a water conditioning polymer; wherein the composition performs both a cleaning and rinsing function. In preferred embodiments, the alkalinity source comprises an alkali metal carbonate, and the surface modification polymer comprises a modified gum-based polysaccharide and/or an amphoteric polymer.

In an aspect, the alkalinity source is present in the composition in an amount of from about 10 wt-% to about 95 wt-%, the surface modification polymer is present from about 0.1 wt-% to about 5 wt-%, the alcohol alkoxylate nonionic surfactant is present from about 0.1 wt-% to about 30 wt-%, the builder is present from about 0.1 wt-% to about 50 wt-%, and the water conditioning polymer is present in an amount from about 1 wt-% to about 50 wt-%.

In a further aspect, the modified gum-based polysaccharide comprises a cationic guar or cationic guar derivative, or a hydroxypropyl-modified guar or hydroxypropyl-modified guar derivative. In embodiments, the modified gum-based polysaccharide comprises guar gum 2 hydroxy-3-(trimethylammonium)propyl ether chloride and/or guar gum 2-hydroxypropyl ether. In additional embodiments, the amphoteric polymer comprises an acrylic acid/diallyldimethylammonium chloride (DADMAC) copolymer.

Beneficially, the surface modification agent and alcohol alkoxylate nonionic surfactant synergistically provides for improved cleaning and rinsing on wares. In an aspect, the alcohol alkoxylate is linear or branched, has a carbon chain between about 4 and about 20, and has from about 5 moles to about 30 moles of alkyl oxide. In some embodiments, the alcohol alkoxylate is linear and has from about 5 moles to about 10 moles of alkyl oxide. In an aspect, the composition provides substantially similar cleaning and rinsing performance as separate detergent and rinse aid compositions.

In another embodiment, a method of cleaning and rinsing ware comprises: contacting the ware with an alkaline detergent composition comprising an alkalinity source, a surface modification polymer, an alcohol alkoxylate nonionic surfactant, a builder, and a water conditioning polymer; rinsing the ware with water; wherein no separate rinse aid composition is employed in the method, and wherein the alkaline detergent composition provides at least substantially similar cleaning and rinsing performance as separate detergent and rinse aid compositions. In preferred embodiments, the alkalinity source comprises an alkali metal carbonate, and the surface modification polymer comprises a modified gum-based polysaccharide and/or an amphoteric polymer.

In an aspect the alkaline detergent composition is diluted to form a use solution prior to contacting the ware. In an embodiment, the alkaline detergent composition comprises the alkalinity source from about 10 wt-% to about 95 wt-%; the surface modification polymer from about 0.1 wt-% to about 5 wt-%; the alcohol alkoxylate nonionic surfactant from about 0.1 wt-% to about 30 wt-%; the builder from about 0.1 wt-% to about 50 wt-%; and the water conditioning polymer from about 1 wt-% to about 50 wt-%. In a further aspect, a use solution of the alkaline detergent composition has an active concentration between about 500 ppm to about 2000 ppm.

In an aspect, the alkaline detergent composition does not impart a visible layer or film on the treated ware, and provides substantially similar cleaning performance to a two-part detergent and rinse aid composition that does not contain the surface modification polymer in combination with an alcohol alkoxylate. In an embodiment, the alkaline detergent composition is a single use or multi-use solid composition. In preferred embodiments, the method is used in an undercounter warewash machine.

While multiple embodiments are disclosed, still other embodiments of the present invention will become apparent to those skilled in the art from the following detailed description, which shows and describes illustrative embodiments of the invention. Beneficially, any embodiment disclosed may be combined with other disclosed embodiments in any manner and not limited to the specific embodiments disclosed. Accordingly, the drawings and detailed description are to be regarded as illustrative in nature and not restrictive.

Figure 1:
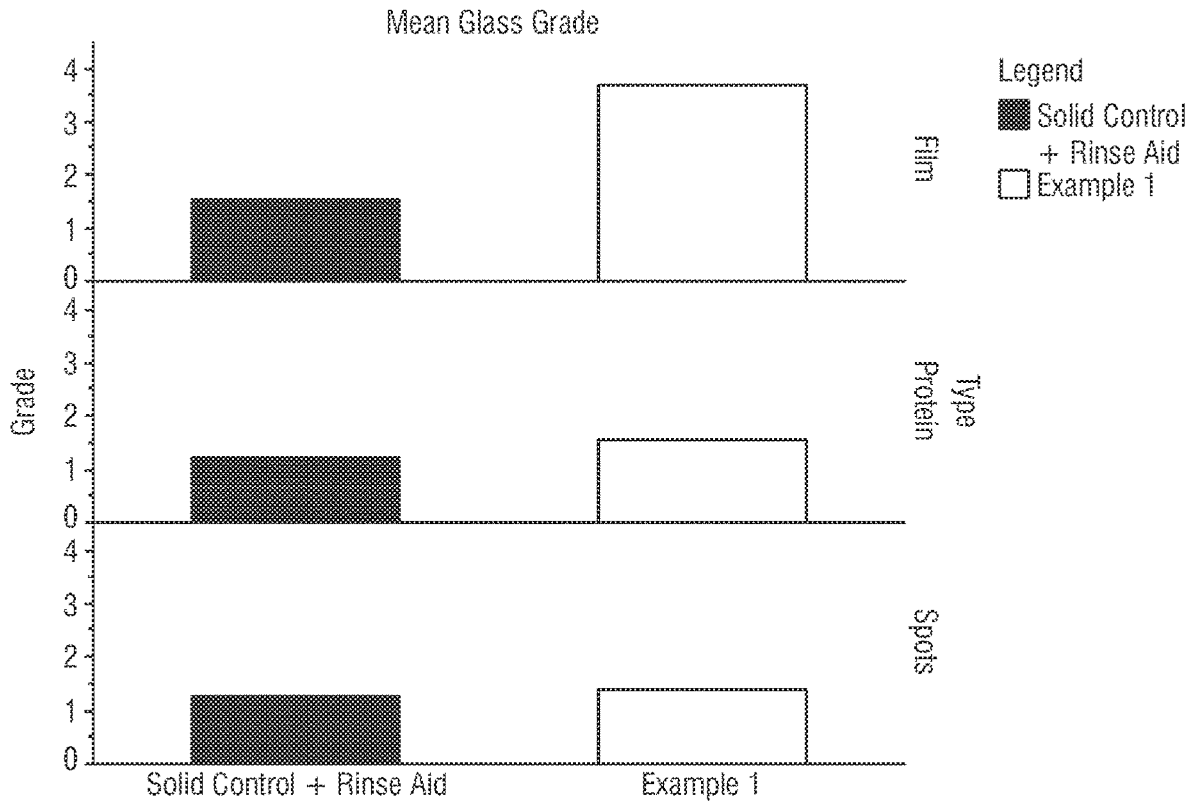
FIG. 1 shows a graph of the mean glass grade of an evaluated 2-in-1 detergent composition compared to a commercial control.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The 2-in-1 alkaline cleaning compositions provide suitable cleaning and rinseability while employing a carbonate-based alkaline detergent and a combination of surfactants. The embodiments described herein are not limited to particular alkaline detergents, which can vary and are understood by skilled artisans based upon the disclosure provided herein. It is further to be understood that all terminology used herein is for the purpose of describing particular embodiments only, and is not intended to be limiting in any manner or scope. For example, as used in this specification and the appended claims, the singular forms “a,” “an” and “the” can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term “about,” as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term “about” also encompasses amounts that differ due to different equilibrium conditions for a composition resulting from a particular initial mixture. Whether or not modified by the term “about”, the claims include equivalents to the quantities.

The term “actives” or “percent actives” or “percent by weight actives” or “actives concentration” are used interchangeably herein and refers to the concentration of those ingredients involved in cleaning expressed as a percentage minus inert ingredients such as water or salts.

As used herein, the term “alkyl” refers to a straight or branched chain monovalent hydrocarbon group optionally containing one or more heteroatomic substitutions independently selected from S, O, Si, or N. Alkyl groups generally include those with one to twenty atoms. Alkyl groups may be unsubstituted or substituted with those substituents that do not interfere with the specified function of the composition. Substituents include alkoxy, hydroxy, mercapto, amino, alkyl substituted amino, or halo, for example. Examples of "alkyl" as used herein include, but are not limited to, methyl, ethyl, n-propyl, n-butyl, n-pentyl, isobutyl, isopropyl, and C8-C20 alkyl chains and the like. In addition, "alkyl" may include "alkylenes", "alkenylenes", or "alkylynes".

As used herein, the term "alkylene" refers to a straight or branched chain divalent hydrocarbon group optionally containing one or more heteroatomic substitutions independently selected from S, O, Si, or N. Alkylene groups generally include those with one to twenty atoms. Alkylene groups may be unsubstituted or substituted with those substituents that do not interfere with the specified function of the composition. Substituents include alkoxy, hydroxy, mercapto, amino, alkyl substituted amino, or halo, for example. Examples of "alkylene" as used herein include, but are not limited to, methylene, ethylene, propane-1,3-diyl, propane-1,2-diyl and the like.

As used herein, the term "alkenylene" refers to a straight or branched chain divalent hydrocarbon group having one or more carbon-carbon double bonds and optionally containing one or more heteroatomic substitutions independently selected from S, O, Si, or N. Alkenylene groups generally include those with one to twenty atoms. Alkenylene groups may be unsubstituted or substituted with those substituents that do not interfere with the specified function of the composition. Substituents include alkoxy, hydroxy, mercapto, amino, alkyl substituted amino, or halo, for example. As used herein, the term "alkylyne" refers to a straight or branched chain divalent hydrocarbon group having one or more carbon-carbon triple bonds and optionally containing one or more heteroatomic substitutions independently selected from S, O, Si, or N. Alkylyne groups generally include those with one to twenty atoms. Alkylyne groups may be unsubstituted or substituted with those substituents that do not interfere with the specified function of the composition. Substituents include alkoxy, hydroxy, mercapto, amino, alkyl substituted amino, or halo, for example.

As used herein, the term "alkoxy", refers to —O-alkyl groups wherein alkyl is as defined above. As used herein, the term "cleaning" refers to a method used to facilitate or aid in soil removal, bleaching, microbial population reduction, and any combination thereof.

The term "generally recognized as safe" or "GRAS," as used herein refers to components classified by the Food and Drug Administration as safe for direct human food consumption or as an ingredient based upon current good manufacturing practice conditions of use, as defined for example in 21 C.F.R. Chapter 1, § 170.38 and/or 570.38.

As used herein, the term "soil" or "stain" refers to a polar or non-polar substances which may or may not contain particulate matter such as, but not limited to mineral clays, sand, natural mineral matter, carbon black, graphite, kaolin, environmental dust and food soils such as polyphenols starches, proteins, oils and fats, etc.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

The term "substantially similar rinsing performance" refers generally to achievement by a substitute rinse aid product or substitute rinsing system of generally the same degree (or at least not a significantly lesser degree) of sheeting or drying, or with generally the same expenditure (or at least not a significantly lesser expenditure) of effort, or both.

As used herein, the term "ware" refers to items such as eating and cooking utensils, and dishes. As used herein, the term "warewashing" refers to washing, cleaning, or rinsing ware. Ware also refers to items made of plastic. Types of plastics that can be cleaned with the compositions according to the invention include but are not limited to, those that include polycarbonate polymers (PC), acrilonitrile-butadiene-styrene polymers (ABS), and polysulfone polymers (PS). Other exemplary plastics that can be cleaned using the compounds and compositions of the invention include polyethylene terephthalate (PET) and plastics from melamine resin.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Alkaline 2-in-1 Detergent Compositions

Exemplary ranges of the 2-in-1 alkaline detergent compositions described herein are shown in Table 1 in weight percentage of the solid detergent compositions. In an aspect, the 2-in-1 alkaline detergent compositions comprise an alkalinity source, a surface modification polymer, an alcohol alkoxylate nonionic surfactant, a builder, and a water conditioning agent, wherein the composition performs both a cleaning and rinsing function.

TABLE 1

| Material | First Exemplary Range wt-% | Second Exemplary Range wt-% | Third Exemplary Range wt-% | Fourth Exemplary Range wt-% |
|---|---|---|---|---|
| Alkalinity Source | 10-95 | 25-90 | 40-95 | 50-80 |
| Surface Modification Polymer | 0.1-5 | 0.1-2 | 0.5-2 | 1-2 |
| Alcohol Alkoxylate Surfactants | 0.1-30 | 0.1-25 | 1-20 | 1-10 |
| Builders | 0.1-50 | 1-50 | 1-25 | 1-20 |
| Water conditioning Polymer | 1-50 | 1-40 | 2-40 | 5-20 |

TABLE 1-continued

| Material | First Exemplary Range wt-% | Second Exemplary Range wt-% | Third Exemplary Range wt-% | Fourth Exemplary Range wt-% |
|---|---|---|---|---|
| Additional Functional Ingredients | 0-40 | 0-30 | 0-25 | 0-20 |

Alkalinity Source

The alkaline detergent compositions include an alkalinity source. The alkalinity source comprises an alkali metal carbonate. Examples of suitable alkalinity sources include but are not limited to: alkali metal carbonates, such as sodium carbonate, potassium carbonate, bicarbonate, sesquicarbonate, and mixtures thereof. In an aspect, the alkaline detergent compositions do not include a hydroxide alkalinity source. The alkalinity source controls the pH of the use solution when water is added to the detergent composition to form a use solution. The pH of the use solution must be maintained in the alkaline range in order to provide sufficient detergency properties. In one embodiment, the pH of the use solution is between about 9 and about 12. Particularly, the pH of the use solution is between about 9.5 and about 11.5.

In certain embodiments, the alkalinity source may also function as a hydratable salt to form a solid composition. The hydratable salt can be referred to as substantially anhydrous. By substantially anhydrous, it is meant that the component contains less than about 2% by weight water based upon the weight of the hydratable component. The amount of water can be less than about 1% by weight, and can be less than about 0.5% by weight. As one skilled in the art will ascertain, there is no requirement that the hydratable salt be completely anhydrous. In certain embodiments, there is also water of hydration to hydrate the alkalinity source (i.e. hydratable salt). It should be understood that the reference to water includes both water of hydration and free water. The phrase "water of hydration" refers to water which is somehow attractively bound to a non-water molecule. An exemplary form of attraction includes hydrogen bonding. The water of hydration also functions to increase the viscosity of the mixture during processing and cooling to prevent separation of the components. The amount of water of hydration in the detergent composition will depend on the alkalinity source/hydratable salt. In addition to water of hydration, the detergent composition may also have free water which is not attractively bound to a non-water molecule.

In an aspect, the alkaline detergent compositions include from about 10 wt-% to about 95 wt-% alkalinity source, from about 25 wt-% to about 90 wt-% alkalinity source, from about 40 wt-% to about 90 wt-% alkalinity source, or from about 50 wt-% to about 80 wt-% alkalinity source. In addition, without being limited according to the invention, all ranges recited are inclusive of the numbers defining the range and include each integer within the defined range.

Surface Modification Polymer

The alkaline detergent compositions include a surface modification polymer. Suitable surface modification (or modifying) polymers comprise polysaccharides, such as modified gum-based polysaccharides. Surface modification polymers can also comprise amphoteric polymers.

In an embodiment, cationic polysaccharides are employed. The polysaccharide is derivatized or modified by a cationizing agent so as to contain a cationic group. The resulting compound is the cationic polysaccharide, providing a net positive charge under conditions of use. As used herein, the term "cationic groups" refers to positively charged groups and to partially charged groups. As used herein, the expression "partially charged groups" designates groups which may become positively charged depending on the pH of the formulation. Such groups may also be named "potentially cationic groups". As used herein, the term "cationic" means at least partially cationic. Thus, the terms "cationizing agents", "cationic groups" and "cationic moieties" include ammoniums (which have a positive charge) but also primary, secondary, and tertiary amines and their precursors (which can lead to positively charged compounds).

In an embodiment the surface modification polymer is a modified gum-based polysaccharide comprising a cationically modified gum-based polysaccharide. In additional embodiments, the surface modification polymer is a hydroxypropyl-modified gum-based polysaccharide. Examples of natural gum-based polysaccharides are polygalactomannans like guar gums or locust bean gums, polygalactans like carrageenans, polysaccharide or gluconate copolymers, polymannuronates or mannuronate-guluronate copolymers, and the like. These natural gum-based polysaccharides can be classified as unmodified by any additional groups such as cationic groups or hydroxypropyl groups. For example, guar gum is a galactomannan, or a high molecular weight carbohydrate polymer or polysaccharide made up of mannose and galactose units linked together. Unmodified guar gums do not contain any additional modifications to the mannose and galactose units. However, the gum-based polysaccharides to be suitable for the compositions described herein are cationically modified or hydroxypropyl-modified. In an embodiment, the surface modification polymer does not include unmodified gum-based polysaccharides or gum-based polysaccharides that have not been cationically modified. In a further embodiment, the surface modification polymer does not include gum-based polysaccharides that have not been hydroxypropyl-modified.

For the compositions described herein, the surface modification polymer is a cationic gum-based polysaccharide comprising a cationic guar or cationic guar derivative (such as cationic guar ethers and cationic guar esters), alone or in mixture. Preferably the cationic polysaccharide is a cationic guar gum. Exemplary cationic guars include those obtained according to derivatization techniques such as those described in U.S. Pat. No. 5,756,720; EP0,686,643, EP1501873 and US2003/0044479. Additional modified gum-based polysaccharides comprise a hydroxypropyl-modified guar or hydroxypropyl-modified guar derivative (such as a hydroxypropyl guar ethers and hydroxypropyl guar esters), alone or in mixture. Exemplary guar gums are hydroxypropyl-modified guars such as guar gum 2-hydroxypropyl ether or cationically modified guars such as guar gum 2 hydroxy-3-(trimethylammonium)propyl ether, including those described in U.S. Pat. No. 9,624,455, or a combination thereof.

In an embodiment the surface modification polymer is a hydrophilic polymer.

In an embodiment the surface modification polymer is a cationically modified guar gum. A suitable cationically modified guar gum comprises guar gum 2 hydroxy-3-(trimethylammonium)propyl ether chloride, available as MIRAPOL® Surf N ADW, JAGUAR® C 17, JAGUAR® C 500, JAGUAR® C 135, JAGUAR® C 145, JAGUAR® Excel, JAGUAR® Optima, and JAGUAR® C 1000 (Solvay), N-HANCE™ 3215 (Ashland), and CESMATIC™ DP4.

In an embodiment the surface modification polymer is 2-hydroxypropyl ether, such as JAGUAR® 8000, JAGUAR® 8012, JAGUAR® 8021, JAGUAR® 8060, JAGUAR® 8111, JAGUAR® NHP 120, JAGUAR® HP 8, JAGUAR® HP 11, JAGUAR® HP 60, JAGUAR® HP 80, JAGUAR® HP 120 and JAGUAR® HP 105 (Solvay).

In an embodiment the surface modification polymer is a mixture of an amphoteric polymer and citric acid, wherein the amphoteric polymer is an acrylic acid/diallyldimethylammonium chloride (DADMAC) copolymer in about a 60/40 mole ratio, available as Mirapol Surf S 480 PF.

In an embodiment the surface modification polymer is a mixture of an amphoteric polymer and carbonate, wherein the amphoteric polymer is an acrylic acid/DADMAC copolymer, available as Mirapol Surf S P-Free. In an embodiment, the weight percent ratio of acrylic acid to DADMAC is between about 5:1 to about 25:1.

In an aspect, the alkaline detergent compositions include from about 0.1 wt-% to about 5 wt-% surface modification polymer, from about 0.1 wt-% to about 2 wt-% surface modification polymer, from about 0.5 wt-% to about 2 wt-% surface modification polymer, or from about 1 wt-% to about 2 wt-% surface modification polymer. In addition, without being limited according to the invention, all ranges recited are inclusive of the numbers defining the range and include each integer within the defined range.

Alcohol Alkoxylate Nonionic Surfactant

The 2-in-1 alkaline compositions according to the invention employ an alcohol alkoxylate surfactant to provide good cleanability and rinseability without causing the filming with the surface modification polymer. Suitable alcohol alkoxylates include linear or branched compounds having a carbon chain between about 4 and about 20 carbons in length. In preferred embodiments, the alcohol alkoxylates are linear compounds.

Suitable alcohol alkoxylates include ethylene oxide, propylene oxide, butylene oxide groups, and mixtures thereof. Particularly, suitable alcohol alkoxylates can have between about 1 and about 40 moles of alkyl oxide and carbon chains between about 4 and about 20 carbons in length. In a preferred embodiment the alcohol alkoxylate may be a C8-C18 alcohol alkoxylate with about 3 to about 40 moles of alkyl oxide. In a more preferred embodiment, the alcohol alkoxylate may be a C8-C16 alcohol alkoxylate with about 5 to about 30 moles of alkyl oxide, or from about 5 to about 10 moles of alkyl oxide. In an even more preferred embodiment, the alcohol alkoxylate may be a C12-C15 alcohol alkoxylate with about 5 to about 10 moles of alkyl oxide. In an embodiment, alcohol alkoxylates with less than 10 moles of alkyl oxide provide for improved reduction and/or prevention of filming when combined with a surface modification polymer.

Examples of preferred alcohol alkoxylates are available under the brands Dehypon (available from BASF) including Dehypon LS-54 (R-$(EO)_5(PO)_4$) and Dehypon LS-36 (R-$(EO)_3(PO)_6$), Surfonic (available from Huntsman), Rhodasurf (available from Solvay), Novel (available from Sasol), Lutensol (available from BASF), and mixtures thereof, or the like. In additional embodiments, suitable alkoxylated surfactants include capped alcohol alkoxylates, such as Plurafac RA 300, Plurafac LF 221, Plurafac SLF-180, mixtures thereof, or the like.

In an embodiment, the alcohol alkoxylate surfactant is included in the alkaline detergent compositions from about 0.1 wt-% to about 30 wt-%, from about 0.1 wt-% to about 25 wt-%, from about 1 wt-% to about 20 wt-%, or from about 1 wt-% to about 10 wt-%. In addition, without being limited according to the invention, all ranges recited are inclusive of the numbers defining the range and include each integer within the defined range.

The treatise Nonionic Surfactants, edited by Schick, M. J., Vol. 1 of the Surfactant Science Series, Marcel Dekker, Inc., New York, 1983 provides further description of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch). Each of these references is herein incorporated by reference in their entirety.

Builders

The alkaline detergent composition can include one or more building agents, also called chelating or sequestering agents (e.g. builders) to treat or soften water and to prevent formation of precipitates or other salts. These may include, but are not limited to: condensed phosphates, alkali metal carbonates, alkali metal silicates and metasilicates, phosphonates, aminocarboxylic acids, and/or polycarboxylic acid polymers. In general, a chelating agent is a molecule capable of coordinating (i.e., binding) the metal ions commonly found in natural water to prevent the metal ions from interfering with the action of the other detersive ingredients of a cleaning composition.

Examples of condensed phosphates include, but are not limited to: sodium and potassium orthophosphate, sodium and potassium pyrophosphate, sodium tripolyphosphate, and sodium hexametaphosphate. A condensed phosphate may also assist, to a limited extent, in solidification of the detergent composition by fixing the free water present in the composition as water of hydration. A preferred builder is sodium tripolyphosphate anhydrous.

Examples of phosphonates include, but are not limited to: 2-phosphonobutane-1,2,4-tricarboxylic acid (PBTC), 1-hydroxyethane-1,1-diphosphonic acid, $CH_2C(OH)[PO(OH)_2]_2$; aminotri(methylenephosphonic acid), $N[CH_2PO(OH)_2]_3$; aminotri(methylenephosphonate), sodium salt (ATMP), $N[CH_2PO(ONa)_2]_3$; 2-hydroxyethyliminobis (methylenephosphonic acid), $HOCH_2CH_2N[CH_2PO(OH)_2]_2$; diethylenetriaminepenta(methylenephosphonic acid), $(HO)_2POCH_2N[CH_2CH_2N[CH_2PO(OH)_2]_2]_2$; diethylenetriaminepenta(methylenephosphonate), sodium salt (DTPMP), $C_9H_{(28-x)}N_3Na_xO_{15}P_5$ (x=7); hexamethylenediamine(tetramethylenephosphonate), potassium salt, $C_{10}H_{(28-x)}N_2KxO_{12}P_4$ (x=6); bis(hexamethylene)triamine (pentamethylenephosphonic acid), $(HO_2)POCH_2N[(CH_2)_2N[CH_2PO(OH)_2]_2]_2$; and phosphorus acid, $H_3PO_3$. A preferred phosphonate combination is ATMP and HEDP. A neutralized or alkali phosphonate, or a combination of the phosphonate with an alkali source prior to being added into the mixture such that there is little or no heat or gas generated by a neutralization reaction when the phosphonate is added is preferred. In one embodiment, however, the detergent composition is phosphorous-free.

Useful aminocarboxylic acid materials containing little or no NTA include, but are not limited to: N-hydroxyethylaminodiacetic acid, ethylenediaminetetraacetic acid (EDTA), hydroxyethylenediaminetetraacetic acid, diethylenetriaminepentaacetic acid, N-hydroxyethyl-ethylenediaminetriacetic acid (HEDTA), diethylenetriaminepentaacetic acid (DTPA), aspartic acid-N,N-diacetic acid (ASDA), methylglycinediacetic acid (MGDA), glutamic acid-N,N-diacetic acid (GLDA), ethylenediaminesuccinic acid (EDDS), 2-hydroxyethyliminodiacetic acid (HEIDA), iminodisuccinic acid (IDS), 3-hydroxy-2-2'-iminodisuccinic acid (HIDS) and other similar acids or salts thereof having an amino group with a carboxylic acid substituent. In one embodiment, however, the composition is free of aminocarboxylates.

Preferable levels of addition for builders that can also be chelating or sequestering agents are between about 0.1% to about 50% by weight, about 1% to about 50% by weight, about 1% to about 25% by weight, or about 1% to about 20% by weight. In addition, without being limited according to the invention, all ranges recited are inclusive of the numbers defining the range and include each integer within the defined range.

Water Conditioning Polymer

The alkaline detergent composition includes at least one water conditioning polymer. Water conditioning polymers can include, but are not limited to: polycarboxylates. Exemplary polycarboxylates that can be used as builders and/or water conditioning polymers include, but are not limited to: those having pendant carboxylate (—$CO_2$—) groups such as polyacrylic acid, maleic acid, maleic/olefin copolymer, sulfonated copolymer or terpolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers. In an aspect, the compositions do not contain any carboxylic acid terpolymers. Other suitable water conditioning polymers include starch, sugar or polyols comprising carboxylic acid or ester functional groups. Exemplary carboxylic acids include but are not limited to maleic, acrylic, methacrylic and itaconic acid or salts thereof. Exemplary ester functional groups include aryl, cyclic, aromatic and $C_1$-$C_{10}$ linear, branched or substituted esters. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. These materials may also be used at substoichiometric levels to function as crystal modifiers.

Preferable levels of the water conditioning polymers include between about 1% to about 50% by weight, about 1% to about 40% by weight, about 2% to about 40% by weight, or about 5% to about 20% by weight. In addition, without being limited according to the invention, all ranges recited are inclusive of the numbers defining the range and include each integer within the defined range.

Additional Functional Ingredients

The 2-in-1 alkaline compositions can further be combined with various functional components suitable for use in consumer and/or industrial ware wash applications. In some embodiments, the alkaline detergent and rinse aid compositions including the carbonate-based alkalinity source, alcohol alkoxylate nonionic surfactant, surface modification polymer, builder, and water conditioning agent(s), which make up a large amount, or even substantially all of the total weight of the composition. For example, in some embodiments few or no additional functional ingredients are disposed therein.

In other embodiments, additional functional ingredients may be included in the compositions. The functional ingredients provide desired properties and functionalities to the compositions. For the purpose of this application, the term “functional ingredient” includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning, specifically ware wash applications. However, other embodiments may include functional ingredients for use in other applications.

In preferred embodiments, the compositions do not include additional alkalinity sources, namely alkali metal hydroxides. In further preferred embodiments, the compositions do not include rinse aids.

In other embodiments, the compositions may include additional builders, additional water conditioning agents, stabilizers, defoaming agents, anti-redeposition agents, anti-browning agents, bleaching agents, sanitizers, solubility modifiers, dispersants, anticorrosion agents and metal protecting agents, stabilizing agents, corrosion inhibitors, enzymes, additional sequestrants and/or chelating agents, fragrances and/or dyes, rheology modifiers or thickeners, hydrotropes or couplers, buffers, solvents, solidifying agents and the like. The functional materials may further include an oxidizer for producing the solid composition. When an oxidizer is present, the solid compositions may contain less than 2 wt-% of residual oxygen source, or more preferably less than 0.5 wt-% residual oxygen source.

Additional Water Conditioning Agents

The alkaline detergent compositions can include one or more additional water conditioning agents. In an aspect, phosphonic acids can be employed. Phosphonic acids can be used in the form of water soluble acid salts, particularly the alkali metal salts, such as sodium or potassium; the ammonium salts; or the alkylol amine salts where the alkylol has 2 to 3 carbon atoms, such as mono-, di-, or triethanolamine salts. Preferred phosphonates include the organic phosphonates. Preferred organic phosphonates include phosphono butane tricarboxylic acid (PBTC) available from Bayer Corp. in Pittsburgh Pa. under the tradename of BAYHIBIT™ and hydroxy ethylidene diphosphonic acid (HEDP) such as that sold under the tradename of DEQUEST™ 2010 available from Monsanto Chemical Co. Additional description of suitable water conditioning agents for use in the invention is described in U.S. Pat. No. 6,436,893, which is herein incorporated by reference herein in its entirety.

In an aspect, the compositions include from about 0 wt-% to about 20 wt-% additional water conditioning agent, from about 1 wt-% to about 20 wt-% additional water conditioning agent, or from about 1 wt-% to about 10 wt-% additional water conditioning agent. In addition, without being limited according to the invention, all ranges recited are inclusive of the numbers defining the range and include each integer within the defined range.

Neutralizing Agents

The alkaline detergent compositions may also include a neutralizing agent. For example, in certain embodiments an alkaline neutralizing agent may be employed to neutralize acidic components, such as a water conditioning agent. Suitable alkaline neutralizing agents may include for example alkali metal hydroxides, including but not limited to: sodium hydroxide, potassium hydroxide, lithium hydroxide, and combinations thereof. An alkali metal hydroxide neutralizing agent may be added to the composition in any form known in the art, including as solid beads, dissolved in an aqueous solution, or a combination thereof. Additionally, more than one neutralizing agent may be used according to certain embodiments. In an aspect of the invention, the compositions of the invention do not include hydroxides as alkalinity sources but only to neutralize acidic ingredients in the composition, including for example water conditioning agents such as ATMP.

In an aspect, the compositions include from about 0.1 wt-% to about 10 wt-% neutralizing agent, or from about 0.1 wt-% to about 5 wt-% neutralizing agent. In an embodiment of the invention, the neutralizing agent comprises alkali metal hydroxide in an amount of up to about 10 wt-%, preferably between about 0.01 wt-% and about 10 wt-%. In addition, without being limited according to the invention, all ranges recited are inclusive of the numbers defining the range and include each integer within the defined range.

Anti-Etch Agents

The alkaline detergent compositions may also include an anti-etch agent capable of preventing etching in glass. Examples of suitable anti-etch agents include adding metal ions to the composition such as zinc, zinc chloride, zinc gluconate, aluminum, and beryllium. The corrosion inhibitor can refer to the combination of a source of aluminum ion and a source of zinc ion. The source of aluminum ion and the source of zinc ion provide aluminum ion and zinc ion, respectively, when the solid detergent composition is provided in the form of a use solution. The amount of the corrosion inhibitor is calculated based upon the combined amount of the source of aluminum ion and the source of zinc ion. Anything that provides an aluminum ion in a use solution can be referred to as a source of aluminum ion, and anything that provides a zinc ion when provided in a use solution can be referred to as a source of zinc ion. It is not necessary for the source of aluminum ion and/or the source of zinc ion to react to form the aluminum ion and/or the zinc ion. Aluminum ions can be considered a source of aluminum ion, and zinc ions can be considered a source of zinc ion. The source of aluminum ion and the source of zinc ion can be provided as organic salts, inorganic salts, and mixtures thereof. Exemplary sources of aluminum ion include, but are not limited to: aluminum salts such as sodium aluminate, aluminum bromide, aluminum chlorate, aluminum chloride, aluminum iodide, aluminum nitrate, aluminum sulfate, aluminum acetate, aluminum formate, aluminum tartrate, aluminum lactate, aluminum oleate, aluminum bromate, aluminum borate, aluminum potassium sulfate, aluminum zinc sulfate, and aluminum phosphate. Exemplary sources of zinc ion include, but are not limited to: zinc salts such as zinc chloride, zinc sulfate, zinc nitrate, zinc iodide, zinc thiocyanate, zinc fluorosilicate, zinc dichromate, zinc chlorate, sodium zincate, zinc gluconate, zinc acetate, zinc benzoate, zinc citrate, zinc lactate, zinc formate, zinc bromate, zinc bromide, zinc fluoride, zinc fluorosilicate, and zinc salicylate.

The composition preferably includes from about 0 wt-% to about 10 wt-%, more preferably from about 0.01 wt-% to about 7 wt-%, and most preferably from about 0.01 wt-% to about 1 wt-% of an anti-etch agent. In addition, without being limited according to the invention, all ranges recited are inclusive of the numbers defining the range and include each integer within the defined range.

Anticorrosion Agents

The alkaline detergent compositions may optionally include an anticorrosion agent. Anticorrosion agents provide compositions that generate surfaces that are shinier and less prone to biofilm buildup than surfaces that are not treated with compositions having anticorrosion agents.

Preferred anticorrosion agents which can be used according to the invention include phosphonates, phosphonic acids, triazoles, organic amines, sorbitan esters, carboxylic acid derivatives, sarcosinates, phosphate esters, zinc, nitrates, chromium, molybdate containing components, and borate containing components. Exemplary phosphates or phosphonic acids are available under the name Dequest (i.e., Dequest 2000, Dequest 2006, Dequest 2010, Dequest 2016, Dequest 2054, Dequest 2060, and Dequest 2066) from Solutia, Inc. of St. Louis, Mo. Exemplary triazoles are available under the name Cobratec (i.e., Cobratec 100, Cobratec TT-50-S, and Cobratec 99) from PMC Specialties Group, Inc. of Cincinnati, Ohio. Exemplary organic amines include aliphatic amines, aromatic amines, monoamines, diamines, triamines, polyamines, and their salts. Exemplary amines are available under the names Amp (i.e. Amp-95) from Angus Chemical Company of Buffalo Grove, Ill.; WGS (i.e., WGS-50) from Jacam Chemicals, LLC of Sterling, Kans.; Duomeen (i.e., Duomeen O and Duomeen C) from Akzo Nobel Chemicals, Inc. of Chicago, Ill.; DeThox amine (C Series and T Series) from DeForest Enterprises, Inc. of Boca Raton, Fla.; Deriphat series from Henkel Corp. of Ambler, Pa.; and Maxhib (AC Series) from Chemax, Inc. of Greenville, S.C. Exemplary sorbitan esters are available under the name Calgene (LA-series) from Calgene Chemical Inc. of Skokie, Ill. Exemplary carboxylic acid derivatives are available under the name Recor (i.e., Recor 12) from Ciba-Geigy Corp. of Tarrytown, N.Y. Exemplary sarcosinates are available under the names Hamposyl from Hampshire Chemical Corp. of Lexington, Mass.; and Sarkosyl from Ciba-Geigy Corp. of Tarrytown, N.Y.

The composition optionally includes an anticorrosion agent for providing enhanced luster to the metallic portions of a dish machine and/or providing shinier surfaces. When an anticorrosion agent is incorporated into the composition, it is preferably included in an amount of between about 0.01 wt-% and about 7.5 wt-%, between about 0.01 wt-% and about 5 wt-% and between about 0.01 wt-% and about 3 wt-%.

Antiredeposition Agents

The alkaline detergent compositions may also include an antiredeposition agent capable of facilitating sustained suspension of soils in a cleaning solution and preventing the removed soils from being redeposited onto the substrate being cleaned. Examples of suitable antiredeposition agents include fatty acid amides, complex phosphate esters, styrene maleic anhydride copolymers, and cellulosic derivatives such as hydroxyethyl cellulose, hydroxypropyl cellulose, and the like. The composition preferably includes from about 0.5 wt-% to about 10 wt-% and more preferably from about 1 wt-% to about 5 wt-% of an antiredeposition agent.

Enzymes

The alkaline detergent compositions can include one or more enzymes, which can provide desirable activity for removal of protein-based, carbohydrate-based, or triglyceride-based soils from substrates such as flatware, cups and bowls, and pots and pans. Enzymes suitable for the inventive composition can act by degrading or altering one or more types of soil residues encountered on a surface thus removing the soil or making the soil more removable by a surfactant or other component of the cleaning composition. Both degradation and alteration of soil residues can improve detergency by reducing the physicochemical forces which bind the soil to the surface or textile being cleaned, i.e. the soil becomes more water soluble. For example, one or more proteases can cleave complex, macromolecular protein structures present in soil residues into simpler short chain molecules which are, of themselves, more readily desorbed from surfaces, solubilized, or otherwise more easily removed by detersive solutions containing said proteases.

Suitable enzymes include a protease, an amylase, a lipase, a gluconase, a cellulase, a peroxidase, or a mixture thereof of any suitable origin, such as vegetable, animal, bacterial, fungal or yeast origin. Preferred selections are influenced by factors such as pH-activity and/or stability optima, thermostability, and stability to active detergents, builders, and the like. In this respect bacterial or fungal enzymes are preferred, such as bacterial amylases and proteases, and fungal cellulases. In some embodiments preferably the enzyme is a protease, a lipase, an amylase, or a combination thereof. A valuable reference on enzymes, which is incorporated herein by reference is "Industrial Enzymes," Scott, D., in Kirk-Othmer Encyclopedia of Chemical Technology, 3rd Edition, (editors Grayson, M. and EcKroth, D.) Vol. 9, pp. 173-224, John Wiley & Sons, New York, 1980.

In embodiments employing an enzyme the composition preferably includes from about 0 wt-% to about 10 wt-%, from about 0.001 wt-% to about 10 wt-%, from about 0.05 wt-% to about 5 wt-%, and more preferably from about 0.1 wt-% to about 3 wt-% of enzyme(s).

Antimicrobial Agent

The alkaline detergent compositions may optionally include an antimicrobial agent or preservative. Antimicrobial agents are chemical compositions that can be used in the composition to prevent microbial contamination and deterioration of commercial products material systems, surfaces, etc. Antimicrobial agents may also be sanitizing agents. Generally, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds. The given antimicrobial agent depending on chemical composition and concentration may simply limit further proliferation of numbers of the microbe or may destroy all or a substantial proportion of the microbial population. The terms "microbes" and "microorganisms" typically refer primarily to bacteria and fungus microorganisms. In use, the antimicrobial agents are formed into the final product that when diluted and dispensed using an aqueous stream forms an aqueous disinfectant or sanitizer composition that can be contacted with a variety of surfaces resulting in prevention of growth or the killing of a substantial proportion of the microbial population. Common antimicrobial agents that may be used include phenolic antimicrobials such as pentachlorophenol, orthophenylphenol; halogen containing antibacterial agents that may be used include sodium trichloroisocyanurate, sodium dichloroisocyanurate (anhydrous or dihydrate), iodine-poly (vinylpyrolidin-onen) complexes, bromine compounds such as 2-bromo-2-nitropropane-1,3-diol; quaternary antimicrobial agents such as benzalconium chloride, cetylpyridinium chloride; amines and nitro containing antimicrobial compositions such as hexahydro-1,3,5-tris(2-hydr-oxyethyl)-s-triazine, dithiocarbamates such as sodium dimethyldithiocarbamate, and a variety of other materials known in the art for their microbial properties. Antimicrobial agents may be encapsulated to improve stability and/or to reduce reactivity with other materials in the detergent composition.

When an antimicrobial agent or preservative is incorporated into the composition, it is preferably included in an amount between about 0.01 wt-% to about 5 wt-%, between about 0.01 wt-% to about 2 wt-%, and between about 0.1 wt-% to about 1.0 wt-%.

Foam Inhibitors

A foam inhibitor may be included in addition to the nonionic surfactants of the alkaline cleaning compositions for reducing the stability of any foam that is formed. Examples of foam inhibitors include silicon compounds such as silica dispersed in polydimethylsiloxane, fatty amides, hydrocarbon waxes, fatty acids, fatty esters, fatty alcohols, fatty acid soaps, ethoxylates, mineral oils, polyethylene glycol esters, polyoxyethylene-polyoxypropylene block copolymers, alkyl phosphate esters such as monostearyl phosphate and the like. A discussion of foam inhibitors may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein. The composition preferably includes from about 0 wt-% to about 5 wt-% and more preferably from about 0.01 wt-% to about 3 wt-% of the foam inhibitor.

Additional Surfactants

The compositions of invention may include additional surfactants. Particularly suitable surfactants include nonionic surfactants, amphoteric surfactants, and zwitterionic surfactants. In a preferred embodiment the compositions are substantially free of cationic and/or anionic surfactants. In an aspect, the compositions can include from about 0.01 wt-%-40 wt-% additional surfactants, preferably from about 0.1 wt-%-30 wt-% additional surfactant, more preferably from about 1 wt-%-25 wt-% additional surfactant. In addition, without being limited according to the invention, all ranges recited are inclusive of the numbers defining the range and include each integer within the defined range.

Nonionic Surfactants

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 (R-$(EO)_5(PO)_4$) and Dehypon LS-36 (R-$(EO)_3(PO)_6$) wherein R is an alkyl chain of from about 8 to about 18 carbon atoms; and capped alcohol alkoxylates, such as Plurafac LF 221, Plurafac SLF 180, and Tegoten EC11; mixtures thereof, or the like.

The semi-polar type of nonionic surface active agents is another class of nonionic surfactant useful in compositions of the present invention. Semi-polar nonionic surfactants include the amine oxides, phosphine oxides, sulfoxides and their alkoxylated derivatives.

Amine oxides are tertiary amine oxides corresponding to the general formula:

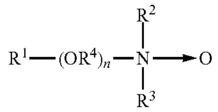

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkylene or a hydroxyalkylene group containing 2 to 3 carbon atoms; and n ranges from 0 to about 20. An amine oxide can be generated from the corresponding amine and an oxidizing agent, such as hydrogen peroxide.

Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate, or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" Cosmetics & Toiletries, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

(MONO)ACETATE (DI)PROPIONATE

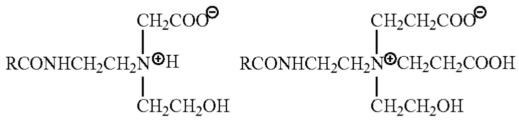

Neutral pH - Zwitterion

AMPHOTERIC SULFONATE

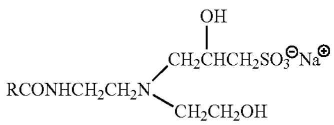

wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which R=$C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na)_2$—$CH_2$—$CH_2$—OH or $C_{12}$-alkyl-C(O)—N(H)—$CH_2$—$CH_2$—$N^+$($CH_2$—$CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Miratainetm JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

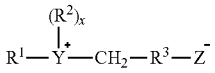

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

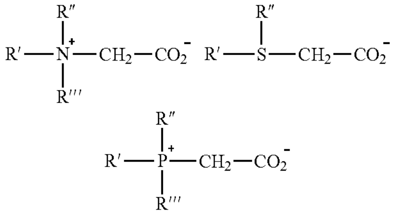

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2\ N^+\ R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references is herein incorporated in their entirety.

In an embodiment, the compositions of the present invention include a betaine. For example, the compositions can include cocoamido propyl betaine.

Method of Use—Ware Washing

In an embodiment, methods of using the solid 2-in-1 detergent compositions involve using the steps of providing an alkaline 2-in-1 detergent composition as disclosed herein. In an embodiment, a solid composition is inserted into a dispenser in or associated with a dish machine, including both industrial and/or consumer warewash machines. Warewash machines in various locations—consumer/home use, restaurants, hotels, care facilities, hospitals, fast food, etc. —are able to empty the solid 2-in-1 detergent compositions. In a particular embodiment, the solid compositions are easy to handle and do not require use of personal protective equipment (PPE). In some embodiments, the solid compositions are particularly well suited for use in an undercounter warewash machine, where handling and dispensing present challenges for alkaline detergents. For example, undercounter warewash machines are typically utilized in locations with minimal space so the solid concentrated, 2-in-1 compositions provide a unique benefit for such an application of use.

In an embodiment, the solid composition is a single-use solid composition. In another embodiment, the solid composition is a multiple-use dosage having between about 10 and about 10,000 doses per solid composition. In another aspect, the solid composition can be formulated in a single-use composition, where it is used one time in a wash. The methods also include forming a wash solution with the alkaline 2-in-1 detergent composition and water, contacting a soil on an article in the dish machine with the wash solution, removing the soil, and rinsing the article with potable water without requiring the use of a separate rinse aid composition. In embodiments, the rinse is with potable water only.

In an embodiment, the 2-in-1 detergent compositions are inserted into a dispenser of a dish machine. The dispenser may be selected from a variety of different dispensers depending on the physical form of the composition. The solid composition may be dispensed using a spray, flood, auger, shaker, tablet-type dispenser, unit dose using a water soluble packet such as polyvinyl alcohol or foil pouch, or diffusion through a membrane or permeable surface. The dispenser may also be a dual dispenser in which one component, is dispensed on one side and another component is dispensed on another side. These exemplary dispensers may be located in or associated with a variety of dish machines including under the counter dish machines, bar washers, door machines, conveyor machines, or flight machines. The dispenser may be located inside the dish machine, remote, or mounted outside of the dishwasher. A single dispenser may feed one or more dish machines.

Once the 2-in-1 detergent composition is inserted into the dispenser, the wash cycle of the dish machine is started and a wash solution is formed. The wash solution comprises the alkaline 2-in-1 detergent composition and water from the dish machine. The water may be any type of water including hard water, soft water, clean water, or dirty water. The most preferred wash solution is one that maintains the preferred pH ranges of about 7 to about 11.5, more preferably about 9.5 to about 11.5, as measured by a pH probe based on a solution of the composition in a 16 gallon dish machine. The same probe may be used to measure millivolts if the probe allows for both functions, simply by switching the probe from pH to millivolts. The dispenser or the dish machine may optionally include a pH probe to measure the pH of the wash solution throughout the wash cycle. The actual concentration or water to detergent ratio depends on the particular surfactant used. Exemplary concentration ranges may include up to 2000 ppm, preferably 1 to 2000 ppm, more preferably 500 to 2000 ppm and most preferably 500 to 1500 ppm of the detergent composition in a use concentration.

The detergent compositions may include concentrate compositions or may be diluted to form use compositions. In general, a concentrate refers to a composition that is intended to be diluted with water to provide a use solution that contacts an object to provide the desired cleaning, rinsing, or the like. The detergent composition that contacts the articles to be washed can be referred to as a concentrate or a use composition (or use solution) dependent upon the formulation employed in methods described herein.

A use solution may be prepared from the concentrate by diluting the concentrate with water at a dilution ratio that provides a use solution having desired detersive and rinsing properties. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil to be removed and the like. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:250 and about 1:2,000 concentrate to water.

A use solution can have an elevated temperature (i.e. heated to an elevated temperature when used according to the methods of the invention. In one example, a use solution having a temperature between approximately 100° F. and about 185° F., between about 100° F. and approximately 140° F. or between about 110° F. and approximately 130° F. for low temperature applications, or between about 120° F. and approximately 185° F. or between about 140° F. and approximately 185° F. for high temperature applications, are contacted with the substrate to be cleaned.

After the wash solution is formed, the wash solution contacts a soil on an article in the dish machine. Examples of soils include soils typically encountered with food such as proteinaceous soils, hydrophobic fatty soils, starchy and sugary soils associated with carbohydrates and simple sugars, soils from milk and dairy products, fruit and vegetable soils, and the like. Soils can also include minerals, from hard water for example, such as potassium, calcium, magnesium, and sodium. Articles that may be contacted include articles made of glass, plastic, aluminum, steel, copper, brass, silver, rubber, wood, ceramic, and the like. Articles include things typically found in a dish machine such as glasses, bowls, plates, cups, pots and pans, bakeware such as cookie sheets, cake pans, muffin pans etc., silverware such as forks, spoons, knives, cooking utensils such as wooden spoons, spatulas, rubber scrapers, utility knives, tongs, grilling utensils, serving utensils, etc. The wash solution may contact the soil in a number of ways including spraying, dipping, sump-pump solution, misting and fogging.

Once the wash solution has contacted the soil, the soil is removed from the article. The removal of the soil from the article is accomplished by the chemical reaction between the wash solution and the soil as well as the mechanical action of the wash solution on the article depending on how the wash solution is contacting the article.

Once the soil is removed, the articles are rinsed as part of the dish machine wash cycle employing potable water without the use of a separate or additional rinse aid composition.

Beneficially, the methods of use provide effective 2-in-1 cleaning and rinsing without the alkaline detergent composition imparting a visible layer or film on the treated ware as is conventionally found when the surface modification polymer is not combined with the alcohol alkoxylate.

The methods can include more steps or fewer steps than laid out here. For example, the method can include additional steps normally associated with a dish machine wash cycle. For example, the method can also optionally include the use of an acidic detergent. For example, the method can optionally include alternating the acidic detergent with an alkaline detergent as described.

Method of Manufacturing the Composition

The compositions of the present invention are solid compositions, namely solid block compositions, including, but not limited to pressed solid compositions, cast solid block compositions, or extruded solid block compositions.

Solid particulate materials can be made by merely blending the dry solid ingredients in appropriate ratios or agglomerating the materials in appropriate agglomeration systems. Pelletized materials can be manufactured by compressing the solid granular or agglomerated materials in appropriate pelletizing equipment to result in appropriately sized pelletized materials. Solid block and cast solid block materials can be made by introducing into a container either a prehardened block of material or a castable liquid that hardens into a solid block within a container. Preferred containers include disposable plastic containers or water soluble film containers. Other suitable packaging for the composition includes flexible bags, packets, shrink wrap, and water soluble film such as polyvinyl alcohol.

The solid detergent compositions may be formed using a batch or continuous mixing system. In an exemplary embodiment, a single- or twin-screw extruder is used to combine and mix one or more components at high shear to form a homogeneous mixture. In some embodiments, the processing temperature is at or below the melting temperature of the components. The processed mixture may be dispensed from the mixer by forming, casting or other suitable means, whereupon the detergent composition hardens to a solid form. The structure of the matrix may be characterized according to its hardness, melting point, material distribution, crystal structure, and other like properties according to known methods in the art. Generally, a solid detergent composition processed according to the method of the invention is substantially homogeneous with regard to the distribution of ingredients throughout its mass and is dimensionally stable.

In an extrusion process, the liquid and solid components are introduced into final mixing system and are continuously mixed until the components form a substantially homogeneous semi-solid mixture in which the components are distributed throughout its mass. The mixture is then discharged from the mixing system into, or through, a die or other shaping means. The product is then packaged. In an exemplary embodiment, the formed composition begins to harden to a solid form in between approximately 1 minute and approximately 3 hours. Particularly, the formed composition begins to harden to a solid form in between approximately 1 minute and approximately 2 hours. More particularly, the formed composition begins to harden to a solid form in between approximately 1 minute and approximately 20 minutes.

In a casting process, the liquid and solid components are introduced into the final mixing system and are continuously mixed until the components form a substantially homogeneous liquid mixture in which the components are distributed throughout its mass. In an exemplary embodiment, the components are mixed in the mixing system for at least approximately 60 seconds. Once the mixing is complete, the product is transferred to a packaging container where solidification takes place. In an exemplary embodiment, the cast composition begins to harden to a solid form in between approximately 1 minute and approximately 3 hours. Particularly, the cast composition begins to harden to a solid form in between approximately 1 minute and approximately 2 hours. More particularly, the cast composition begins to harden to a solid form in between approximately 1 minute and approximately 20 minutes.

In a pressed solid process, a flowable solid, such as granular solids or other particle solids including binding agents (e.g. hydrated chelating agent, such as a hydrated aminocarboxylate, a hydrated polycarboxylate or hydrated anionic polymer, a hydrated citrate salt or a hydrated tartrate salt, or the like together with an alkali metal carbonate) are combined under pressure. In a pressed solid process, flowable solids of the compositions are placed into a form (e.g., a mold or container). The method can include gently pressing the flowable solid in the form to produce the solid cleaning composition. Pressure may be applied by a block machine or a turntable press, or the like. Pressure may be applied at about 1 to about 2000 psi, about 1 to about 300 psi, about 5 psi to about 200 psi, or about 10 psi to about 100 psi. In certain embodiments, the methods can employ pressures as low as greater than or equal to about 1 psi, greater than or equal to about 2, greater than or equal to about 5 psi, or greater than or equal to about 10 psi. As used herein, the term "psi" or "pounds per square inch" refers to the actual pressure applied to the flowable solid being pressed and does not refer to the gauge or hydraulic pressure measured at a point in the apparatus doing the pressing. The method can include a curing step to produce the solid cleaning composition. As referred to herein, an uncured composition including the flowable solid is compressed to provide sufficient surface contact between particles making up the flowable solid that the uncured composition will solidify into a stable solid cleaning composition. A sufficient quantity of particles (e.g. granules) in contact with one another provides binding of particles to one another effective for making a stable solid composition. Inclusion of a curing step may include allowing the pressed solid to solidify for a period of time, such as a few hours, or about 1 day (or longer). In additional aspects, the methods could include vibrating the flowable solid in the form or mold, such as the methods disclosed in U.S. Pat. No. 8,889,048, which is herein incorporated by reference in its entirety.

The use of pressed solids provide numerous benefits over conventional solid block or tablet compositions requiring high pressure in a tablet press, or casting requiring the melting of a composition consuming significant amounts of energy, and/or by extrusion requiring expensive equipment and advanced technical know-how. Pressed solids overcome such various limitations of other solid formulations for which there is a need for making solid cleaning compositions. Moreover, pressed solid compositions retain its shape under conditions in which the composition may be stored or handled.

By the term "solid", it is meant that the hardened composition will not flow and will substantially retain its shape under moderate stress or pressure or mere gravity. A solid may be in various forms such as a powder, a flake, a granule, a pellet, a tablet, a lozenge, a puck, a briquette, a brick, a solid block, a unit dose, or another solid form known to those of skill in the art. The degree of hardness of the solid cast composition and/or a pressed solid composition may range from that of a fused solid product which is relatively dense and hard, for example, like concrete, to a consistency characterized as being a hardened paste. In addition, the term "solid" refers to the state of the detergent composition under the expected conditions of storage and use of the solid detergent composition. In general, it is expected that the detergent composition will remain in solid form when exposed to temperatures of up to approximately 100° F. and particularly up to approximately 120° F.

The resulting solid detergent composition may take forms including, but not limited to: a cast solid product; an extruded, molded or formed solid pellet, block, tablet, powder, granule, flake; pressed solid; or the formed solid can thereafter be ground or formed into a powder, granule, or flake. In an exemplary embodiment, pressed materials have a weight of between approximately 0.5 grams and approximately 250 grams, and solid block detergents formed by the composition have a mass of between approximately 1 and approximately 10 kilograms. In an embodiment, the solid detergent composition has a weight of between about 0.5 grams and about 50 grams, preferably between about 0.5 grams and 20 grams, and most preferably between 1 gram and 10 grams. The solid compositions provide for a stabilized source of functional materials. In some embodiments, the solid composition may be dissolved, for example, in an aqueous or other medium, to create a concentrated and/or use solution. The solution may be directed to a storage reservoir for later use and/or dilution, or may be applied directly to a point of use.

In an aspect of the embodiments, the solid compositions are designed to release a certain portion or amount of the solid composition in each cycle. In an exemplary embodiment, a warewashing cycle releases about 0.5 grams of the solid composition per cycle, about 1 gram of the solid composition per cycle, about 2 grams of the solid composition per cycle, about 5 grams of the solid composition per cycle, about 6 grams of the solid composition per cycle, or about 10 grams of the solid composition per cycle (including all ranges therebetween). Accordingly, a skilled artisan will ascertain from the disclosure that the size of the solid composition can be suited for the number of cycles run on a daily basis (or other increment of time).

The following patents disclose various combinations of solidification, binding and/or hardening agents that can be utilized in the solid cleaning compositions of the present invention. The following U.S. patents are incorporated herein by reference: U.S. Pat. Nos. 7,153,820; 7,094,746; 7,087,569; 7,037,886; 6,831,054; 6,730,653; 6,660,707; 6,653,266; 6,583,094; 6,410,495; 6,258,765; 6,177,392; 6,156,715; 5,858,299; 5,316,688; 5,234,615; 5,198,198; 5,078,301; 4,595,520; 4,680,134; RE32,763; and RE32818.

In an aspect, the solid compositions do not include distinct or separate components thereof. The solid compositions are referred to as a single-part or a one-part system. This is beneficial and distinct from prior detergent compositions which are controlled release as a result of encapsulation, coating or membranes, separate dosing of components, such as in liquid formulations, or having distinct compartments for physical separation of components (sachets, pouches or the like) and must then be combined with a distinct detergent composition or other composition to provide the desired activity.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The materials used in the following Examples are provided herein:

Mirapol® Surf N: Guar gum 2 hydroxy-3-(trimethylammonium)propyl ether chloride, a cationically modified guar gum, available from Solvay.

Mirapol® Surf S P-Free: Acrylic acid/DADMAC copolymer and carbonate, an amphoteric polymer, available from Solvay.

Jaguar® C 500: Guar gum, 2 hydroxy-3-(trimethylammonium)propyl ether chloride, a cationically modified guar gum, available from Solvay.

Jaguar® HP 105: Guar gum 2-hydroxypropyl ether, a hydroxypropyl-modified guar gum, available from Solvay.

Dehypon® LS-36: Alcohol alkoxylate; fatty alcohol C12-C15 with approximately 3 moles EO and 6 moles PO available from BASF.

Dehypon® LS-54: Alcohol alkoxylate; fatty alcohol C12-C15 with approximately 5 moles EO and 4 moles PO available from BASF.

Pluronic® 25R$^2$: EO/PO copolymer with the general structure PO (22)-EO (14)-PO (22), or 20% EO by weight, available from BASF.

Pluronic® N3: EO/PO copolymer with the general structure PO (20)-EO (23)-PO (20), or 30% EO by weight, available from BASF.

Plurafac® RA 300: Alcohol alkoxylate; fatty alcohol C12-C16 with approximately 6 moles EO and 3 moles PO available from BASF.

Plurafac® LF 221: Alcohol alkoxylate; fatty alcohol C12-C15 with approximately 9-10 moles EO and 1-2 moles BO available from BASF.

Plurafac® LF 403: Alcohol alkoxylate; Linear and branched C13-C15 with approximately 5 moles PO, 2 moles EO, and 5 moles PO available from BASF.

Plurafac® SLF 180: Branched alcohol alkoxylate, 2-propylheptanol with approximately 17-20 moles EO and 17-20 moles PO available from BASF.

Acusol 448: Acrylic/maleic copolymer having a molecular weight of 3,500 g/mol and available from Dow Chemical.

ATMP 50%: Aminotri(methylenephosphonate), sodium salt

MGDA: Methylglycinediacetic acid

The evaluated 2-in-1 detergent compositions are shown in Table 2.

TABLE 2

| | Example 1 wt % | Example 2 wt % | Example 3 wt % | Example 4 wt % | Example 5 wt % |
|---|---|---|---|---|---|
| Sodium Carbonate | 75.34 | 75.34 | 76.34 | 75.34 | 74.34 |
| Liquid Sucrose | 1.11 | 1.11 | 1.11 | 1.11 | 1.11 |
| Poly Maleic Acid 50% | 3.42 | 3.42 | 3.42 | 3.42 | 3.42 |
| Acusol 448 | 3.42 | 3.42 | 3.42 | 3.42 | 3.42 |
| ATMP 50% | 1.11 | 1.11 | 1.11 | 1.11 | 1.11 |
| Potassium hydroxide, 45% Liquid | 1.1 | 1.1 | 1.1 | 1.1 | 1.1 |
| MGDA | 5 | 5 | 5 | 5 | 5 |
| Sodium citrate dihydrate | 2.5 | 2.5 | 2.5 | 2.5 | 2.5 |
| Mirapol Surf N ADW | 1 | 1 | 0 | 1 | 2 |
| Pluronic 25R2 | 4 | | | | |
| Pluronic N3 | | 4 | | | |
| Dehypon LS-54 | | | 4 | 4 | 4 |
| Esperase 6.OT | 2 | 2 | 2 | 2 | 2 |
| Sum | 100 | 100 | 100 | 100 | 100 |

Example 1

Fifty Cycle Automatic Dish Wash Detergent Testing

The cleaning efficacy of the example compositions of Table 2 were evaluated using a 50 cycle redeposition experiment for ware wash detergents. The compositions were compared to a two product system—a commercially-available control (solid detergent and rinse aid composition). To test the ability of compositions to clean glass, 6 10 oz. Libby heat resistant glass tumblers were used. The glass tumblers were cleaned prior to use.

A food soil solution was prepared using a 50/50 combination of beef stew and hot point soil and employed at 2000 ppm soil. The soil included two cans of Dinty Moore Beef Stew (1360 grams), one large can of tomato sauce (822 grams), 15.5 sticks of Blue Bonnet Margarine (1746 grams) and powered milk (436.4 grams). The hot point soil was added to the machine to maintain a sump concentration of about 2000 ppm.

After filling the dish machine with 17 grain water, the heaters were turned on. The wash temperature was adjusted to about 150-160° F. The final rinse temperature was adjusted to about 175-190° F. The controller was set to disclose the amount of detergent in the wash tank. The glass tumblers were placed in the dish machine. The dish machine was then started and run through an automatic cycle. At the beginning of each cycle the appropriate amount of hot point soil was added to maintain the sump concentration of 2000 ppm. The detergent concentration is controlled by conductivity. When the 50 cycles ended, the glasses were allowed to dry overnight. Thereafter they were graded for spots and film accumulation (visual).

The glass tumblers were then graded for protein accumulation using Coomassie Brilliant Blue R stain followed by destaining with an aqueous acetic acid/methanol solution.

The Coomassie Brilliant Blue R stain was prepared by combining 1.25 g of Coomassie Brilliant Blue R dye with 45 mL of acetic acid and 455 mL of 50% methanol in distilled water. The destaining solution consisted of 45% methanol and 10% acetic acid in distilled water.

The amount of protein remaining on the glass tumblers after destaining was rated visually on a scale of 1 to 5. A rating of 1 indicated no protein was present after destaining—no spots/no film. A rating of 2 indicated that random areas (barely perceptible) were covered with protein after destaining—spots at random (or about 20% surface covered in film). A rating of 3 indicated that about a quarter to half of the surface was covered with protein after destaining (or about 40% surface covered in film). A rating of 4 indicated that about half of the glass/plastic surface was covered with protein after destaining (or about 60% surface covered in film). A rating of 5 indicated that the entire surface was coated with protein after destaining (or at least about 80% surface covered in film).

The ratings of the glass tumblers tested for soil removal were averaged to determine an average soil removal rating from glass surfaces. Similarly, the ratings of the glass tumblers tested for redeposition were averaged to determine an average redeposition rating for glass surfaces.

Figure 2:
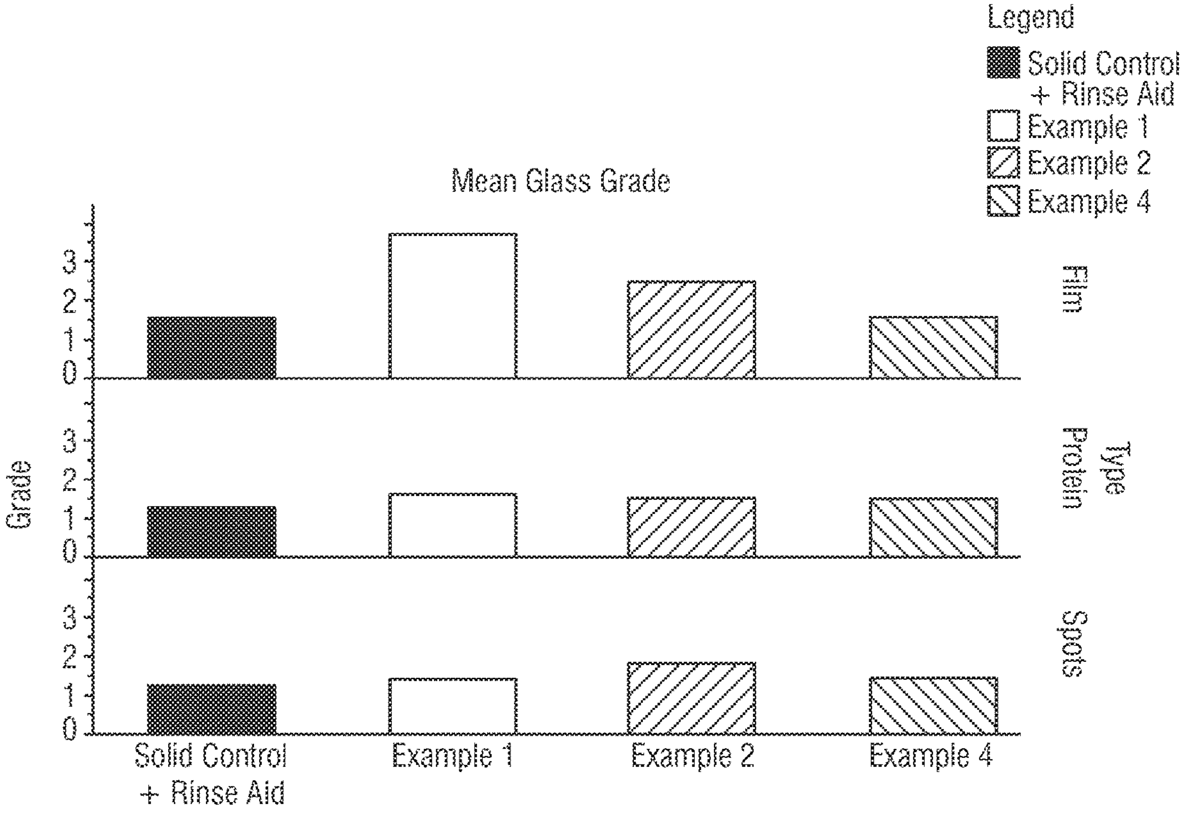
FIG. 2 shows a graph of the mean glass grade of additional evaluated 2-in-1 detergent compositions compared to a commercial control.
Figure 3:
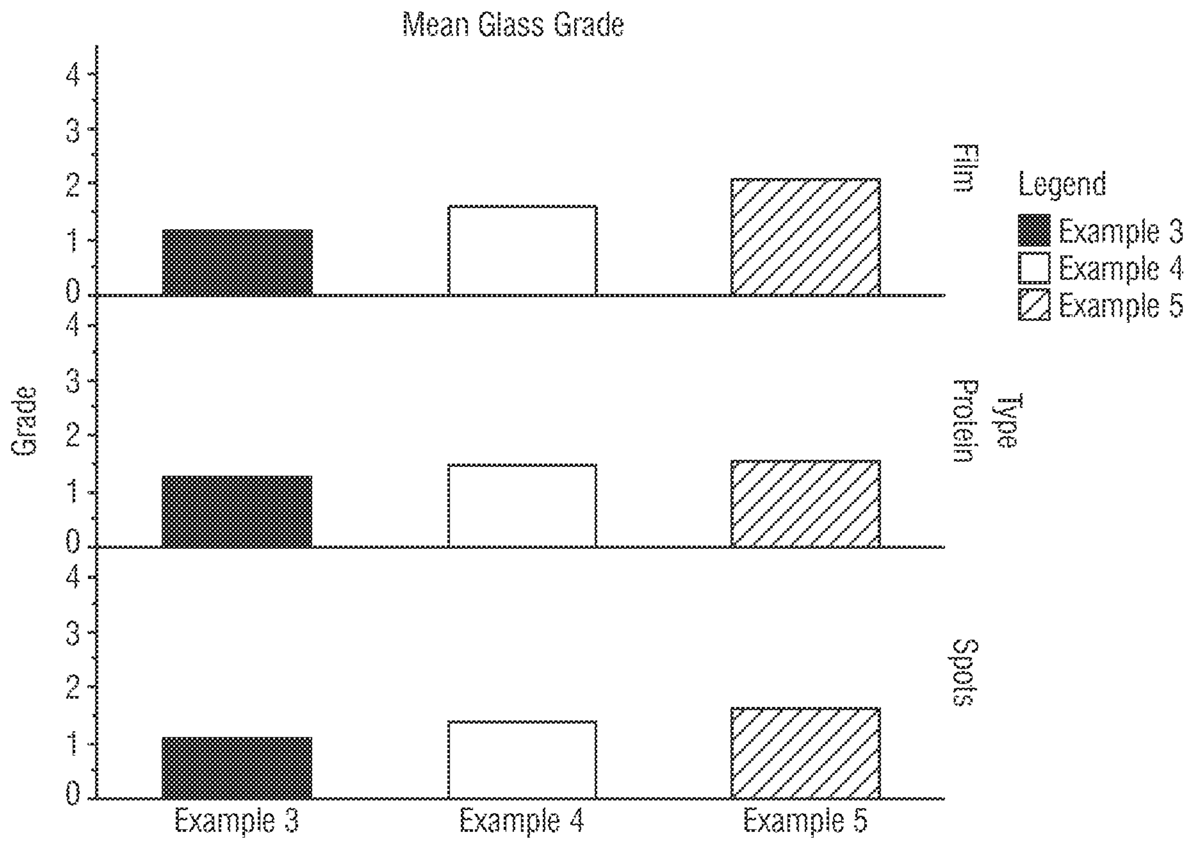
FIG. 3 shows a graph of the mean glass grade of evaluated 2-in-1 detergent compositions described herein.

The results are shown in FIGS. 1-3. FIG. 1 shows Example 1 formulation containing the surface modification polymer with a nonionic surfactant (an EO/PO copolymer) compared to the Control having the same EO/PO copolymer surfactant in the rinse aid composition with additional nonionic surfactants. The results in FIG. 1 show that the Example 1 performed equivalent on spots and protein, indicating good detergency and rinsing performance. However, the composition left a film on the treated glass surface. Therefore, additional surfactants were tested in the example formulations using the 50-cycle test method to determine which surfactants could overcome the filming of the Mirapol Surf N surface modification polymer.

Example formulas 1, 2, 4 were tested and compared to the Solid Control+Rinse Aid. Formulas 1, 2, 4 contain Pluronic 25RS (EO/PO copolymer), Pluronic N3 (EO/PO copolymer), and Dehypon LS-54 (alcohol alkoxylate), respectively. FIG. 2 shows these results that the use of the alcohol alkoxylate Dehypon LS-54 (Example 4) provides the desired film control while also providing the desired performance metrices provided by the formulas with the Mirapol Surf N surface modification polymer (Examples 1 and 2).

Next, the level of the surface modification polymer Mirapol Surf N was tested using the Dehypon LS-54 surfactant to determine the optimal level of the material to produce the best 2-in-1 results with both the 50 cycle test as well as the Sheeting Test. Examples 3, 4, 5 with 0, 1% and 2% Mirapol respectively were tested varying only the level of Mirapol Surf N. The results are shown in FIG. 3 where the Mirapol containing examples 4 and 5 perform very well on spots and protein, however filming increases when the concentration of the surface modification polymer is increased to 2% of the active ingredient in Example 5. Notably, the solid 2-in-1 detergent composition containing 0, 1% and 2% Mirapol respectively are concentrations in a solid block composition, where the testing was run at a 1000 ppm active (total detergent concentration) level. As one skilled in the art will ascertain, a 1% and 2% Mirapol concentration in a solid block can provide effectively filming when used at a lower actives ppm, such as with a total detergent concentration<1000 ppm, 500 ppm, 600 ppm, 700 ppm, 800 ppm, 900 ppm, or ranges therebetween.

Example 2

Measured Drops on Surfaces, Drying Time, and Wetting Score

The combination of the surface modification polymer Mirapol Surf N and the alcohol alkoxylate Dehypon LS-54 were further evaluated using sheeting tests to compare efficacy as a rinse aid (in the 2-in-1 detergent composition).

Figure 4A:
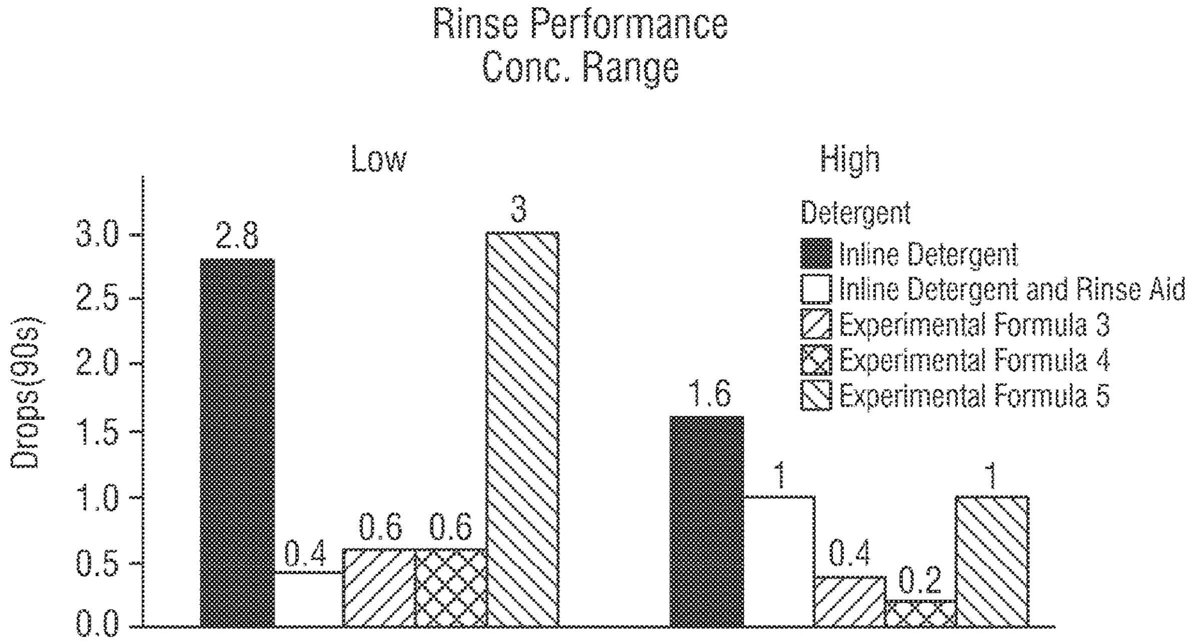
FIGS. 4A-4C show rinse performance data of evaluated 2-in-1 detergent compositions compared to a commercial control for spotting (FIG. 4A), drying time (FIG. 4B) and wetting (FIG. 4C).
Figure 4B:
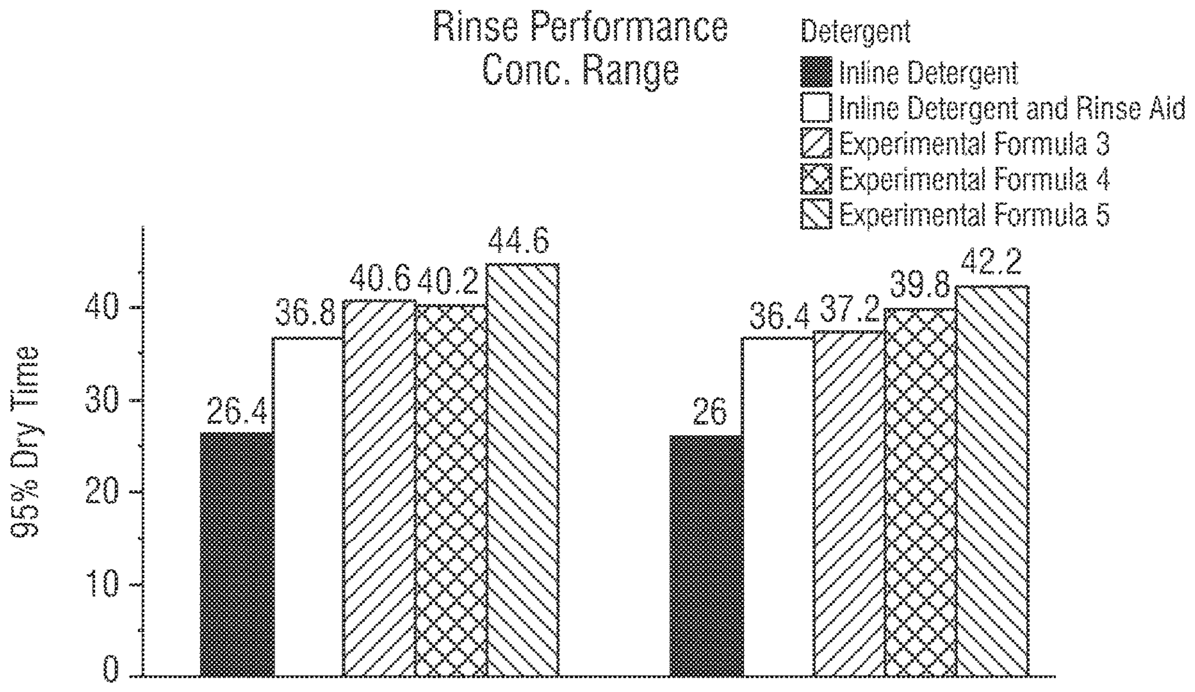
Figure 4C:
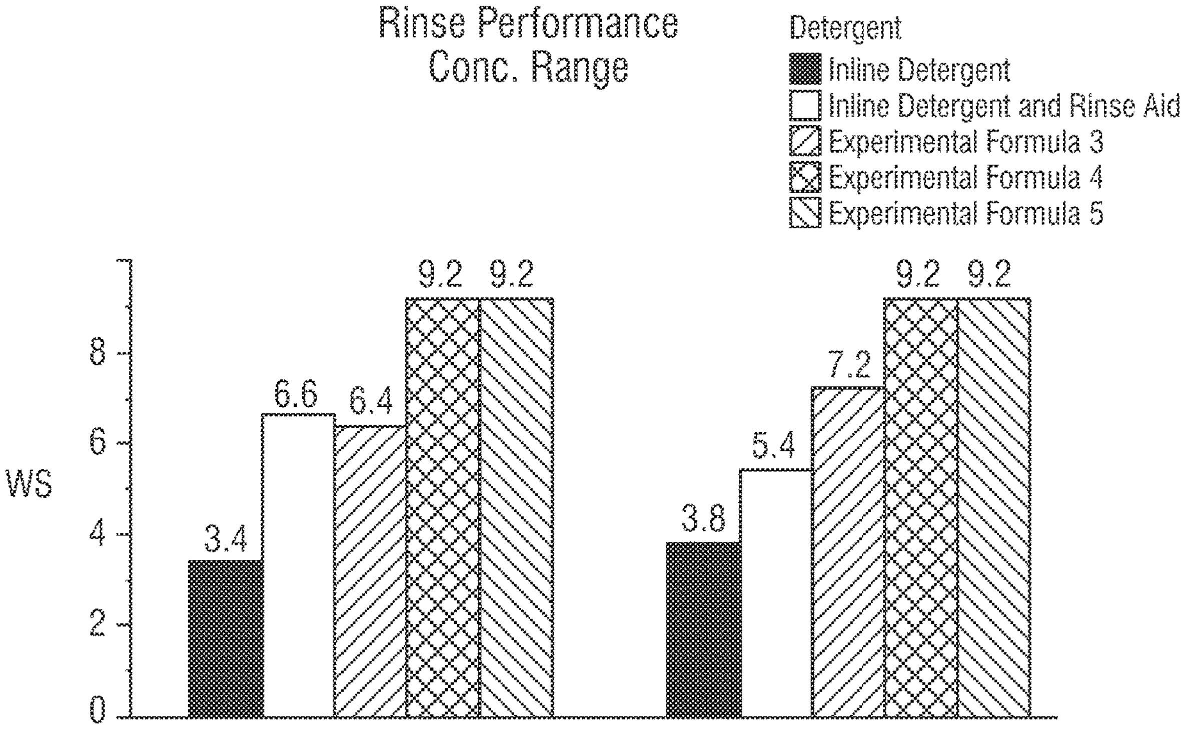

The wetting score (WS), 95% dry time (seconds), and drops remaining on the treated ware at 90 seconds were evaluated for formulas Example 3 (0% Mirapol, 4% Dehypon), Example 4 (1% Mirapol, 4% Dehypon), and Example 5 (2% Mirapol, 4% Dehypon) from Table 2 in comparison to the inline detergent (carbonate alkaline detergent) and an inline detergent with a rinse aid (2 part system). Test wash cycles were run with each of the formulations with melamine plates in 0 gpg water hardness. The wash temperature was about 160° F. and the rinse temperature was about 180° F. For each test, multiple runs (between 3-5 runs) were repeated for each formulation, and the average was calculated for each of the data points. For each test, the 95% dry time was recorded, as well as the drops remaining on the plates at 90 seconds. To determine a wetting score, the degree of sheeting was observed for each of the plates, with a low score signifying partial sheeting, and a higher score signifying completely dry. The results are shown in FIGS. 4A-4C.

The experimental formulas provided substantially similar cleaning performance to the inline detergent and rinse aid when evaluating the dry time, the spotting (drops left on the surface), and improved wetting scores in comparison to the controls. The improved sheeting is demonstrated by the increased/higher wetting score. The 95% dry times for the detergent only appear shorter; however, this is due to the water beading and rivuletting off the melamine plate; however, the increased number of drops (i.e. spotting) indicate that the surface does not fully dry, causing spots on the plate and increased risk of wet stacking.

Example 3

Rinse Performance of Surface Modification Polymers without Surfactant

The rinse performance of various classes of surface modification polymers were further evaluated without the addition of an alcohol alkoxylate. The surface modification polymers analyzed included Mirapol SurfN ADW, Jaguar C 500, Jaguar HP 105, Mirapol Surf S P-Free, and an unmodified guar.

Figure 5:
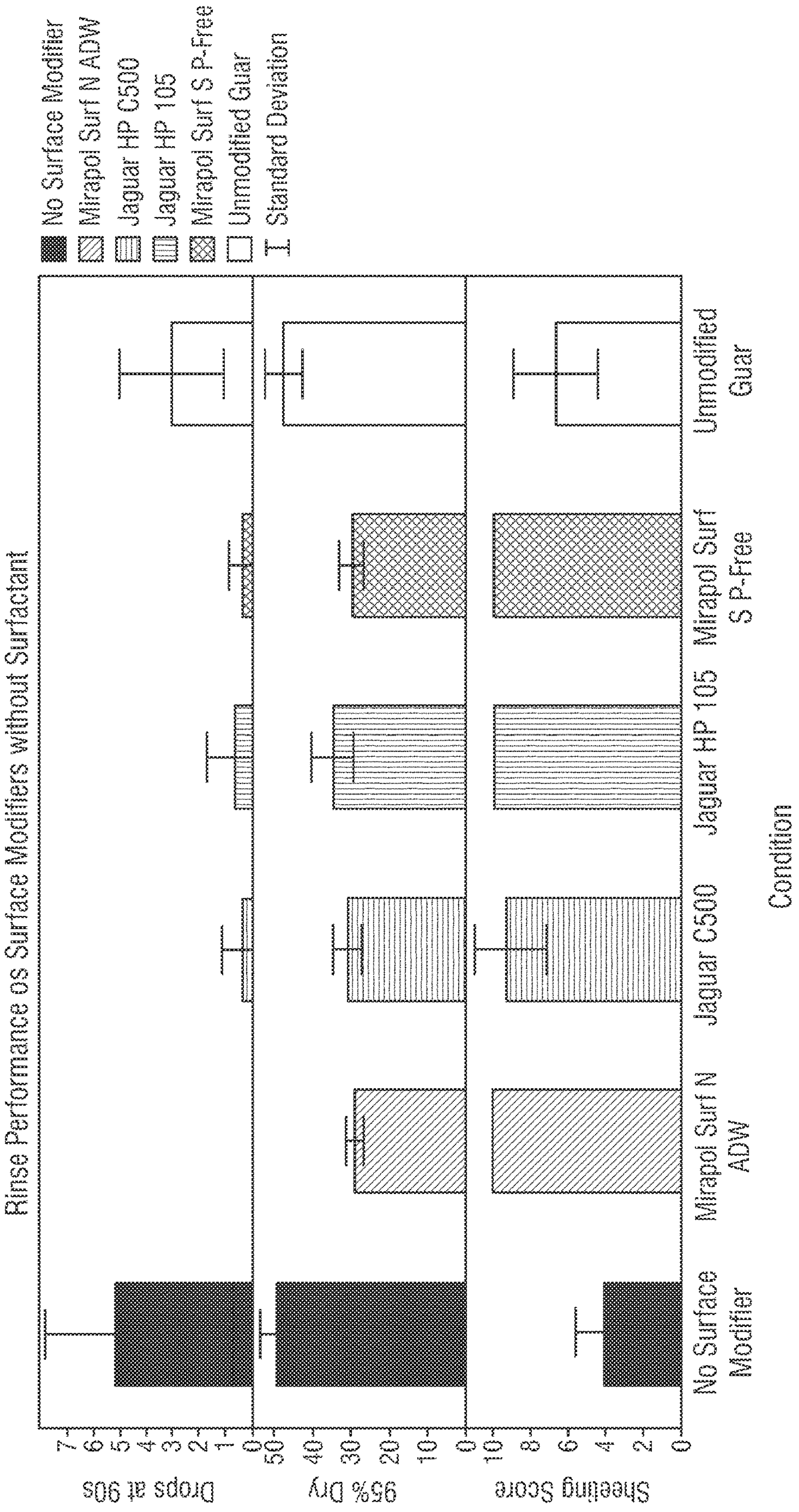
FIG. 5 shows a graph of the rinse performance data of compositions containing various surface modification polymers without a surfactant in comparison to a control composition with no surface modification polymer for spotting, drying time, and sheeting.

The sheeting score, 95% dry time (seconds), and drops remaining on the treated ware at 90 seconds were evaluated for each of the formulations provided in Table 3 below. The various surface modification polymer formulations were compared to a control formulation containing no surface modification polymer. The results are shown in FIG. 5.

TABLE 3

| | Control wt % | Mirapol Surf N ADW wt % | Jaguar C 500 wt % | Jaguar HP 105 wt % | Mirapol Surf S P-Free wt % | Unmodified Guar wt % |
|---|---|---|---|---|---|---|
| Sodium Carbonate | 80.44 | 79.44 | 79.44 | 79.44 | 79.44 | 79.44 |
| Liquid Sucrose | 1.11 | 1.11 | 1.11 | 1.11 | 1.11 | 1.11 |
| Poly Maleic Acid 50% | 3.42 | 3.42 | 3.42 | 3.42 | 3.42 | 3.42 |
| Acusol 448 | 3.42 | 3.42 | 3.42 | 3.42 | 3.42 | 3.42 |
| ATMP 50% | 1.11 | 1.11 | 1.11 | 1.11 | 1.11 | 1.11 |
| Potassium hydroxide, 45% | 1.1 | 1.1 | 1.1 | 1.1 | 1.1 | 1.1 |
| MGDA granulate | 5 | 5 | 5 | 5 | 5 | 5 |
| Sodium citrate dihydrate | 2.5 | 2.5 | 2.5 | 2.5 | 2.5 | 2.5 |
| Mirapol Surf N ADW | | 1 | | | | |
| Jaguar C 500 | | | 1 | | | |
| Jaguar HP 105 | | | | 1 | | |
| Mirapol Surf S P-Free | | | | | 1 | |
| Unmodified Guar | | | | | | 1 |
| Esperase 6.OT | 1.9 | 1.9 | 1.9 | 1.9 | 1.9 | 1.9 |
| Sum | 100 | 100 | 100 | 100 | 100 | 100 |

The results demonstrate that all the formulations including surface modification polymers, with the exception of the unmodified guar formulation, demonstrated superior rinsing performance when evaluating drops remaining, dry time, and sheeting score. As shown in FIG. 5, the formulations including Mirapol Surf N ADW, Jaguar C 500, Jaguar HP 105, and Mirapol Surf S P-Free demonstrated low drops at 90 seconds, low dry time, and high sheeting score in comparison to the formulation containing unmodified guar, or no surface modification polymer. Therefore, these results demonstrate that unmodified guars do not exhibit adequate rinsing properties when evaluated as a rinse aid. However, the results demonstrate that various modified guars such as Mirapol Surf N ADW, Jaguar C 500 and Jaguar HP 105, as well as amphoteric polymers such as Mirapol Surf S P-Free result in good rinsing properties.

Example 4

Additional Fifty Cycle Automatic Dish Wash Detergent Testing

Figure 6:
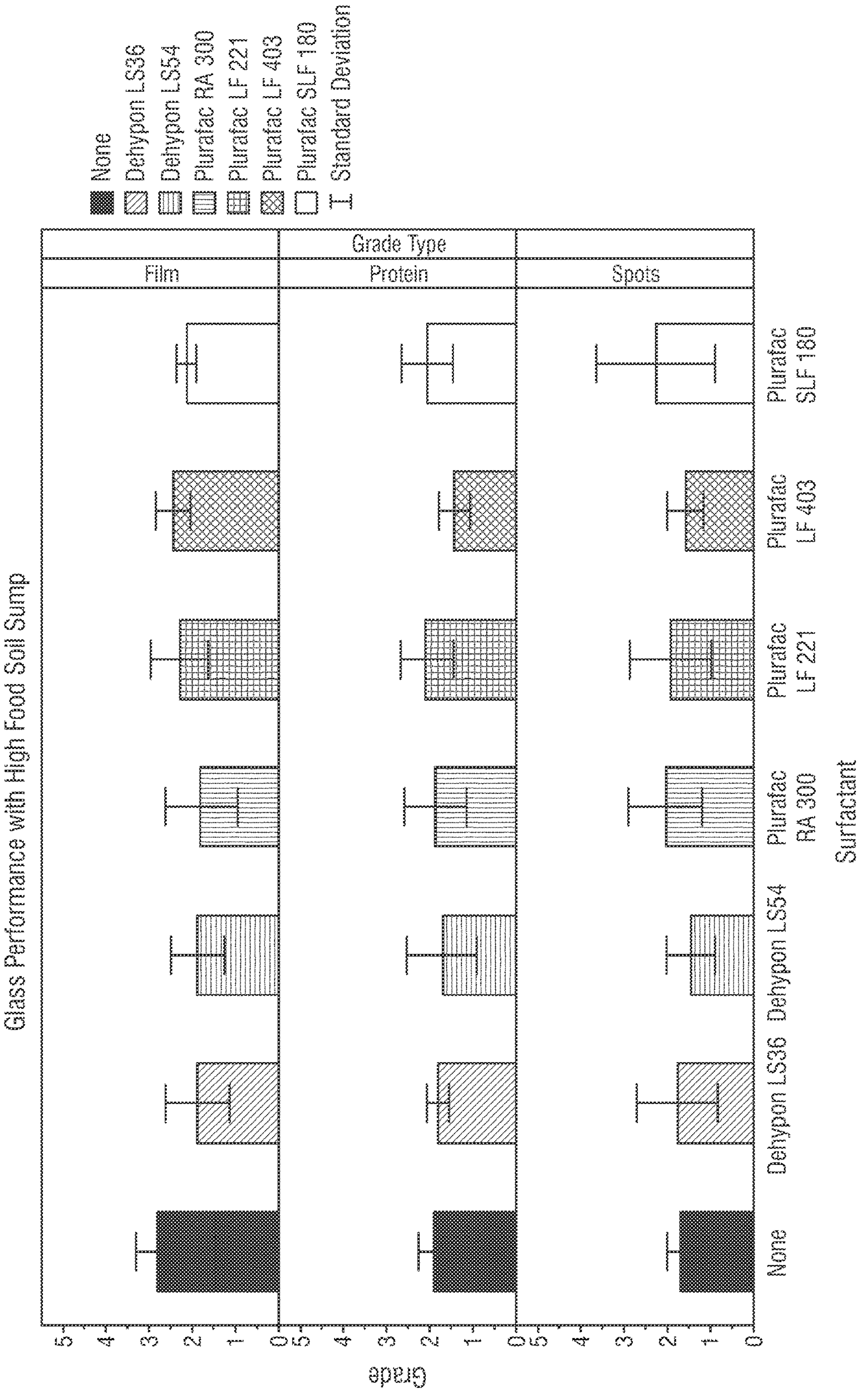
FIG. 6 shows a graph of the mean glass grade of additional evaluated 2-in-1 detergent compositions compared to a control composition containing no alcohol alkoxylate surfactant.

The cleaning efficacy of the 2-in-1 cleaning compositions were further evaluated through the addition of various alcohol alkoxylate surfactants to a surface modification polymer. The formulations of Table 4 were evaluated using the 50 cycle redeposition experiment for ware wash detergents as described in Example 1. The compositions were compared to a control formulation containing a surface modification polymer but no alcohol alkoxylate surfactant. The surface modification polymer used in each formulation was Mirapol Surf N ADW. The various alcohol alkoxylate surfactants evaluated included Dehypon LS-36, Dehypon LS-54, Plurafac RA 300, Plurafac LF 221, Plurafac LF 403, and Plurafac SLF 180. The results are shown in FIG. 6.

As indicated above in Example 1, The amount of protein remaining on the glass tumblers after destaining was rated visually on a scale of 1 to 5. A rating of 1 indicated no protein was present after destaining—no spots/no film. A rating of 2 indicated that random areas (barely perceptible) were covered with protein after destaining—spots at random (or about 20% surface covered in film). A rating of 3 indicated that about a quarter to half of the surface was covered with protein after destaining (or about 40% surface covered in film). A rating of 4 indicated that about half of the glass/plastic surface was covered with protein after destaining (or about 60% surface covered in film). A rating of 5 indicated that the entire surface was coated with protein after destaining (or at least about 80% surface covered in film).

TABLE 4

| | Control wt % | Dehypon LS-36 wt % | Dehypon LS-54 wt % | Plurafac RA 300 wt % | Plurafac LF 221 wt % | Plurafac LF 403 wt % | Plurafac SLF 180 wt % |
|---|---|---|---|---|---|---|---|
| Sodium Carbonate | 79.44 | 75.44 | 75.44 | 75.44 | 75.44 | 75.44 | 75.44 |
| Liquid Sucrose | 1.11 | 1.11 | 1.11 | 1.11 | 1.11 | 1.11 | 1.11 |
| Poly Maleic Acid, 50% | 3.42 | 3.42 | 3.42 | 3.42 | 3.42 | 3.42 | 3.42 |
| Acusol 448 | 3.42 | 3.42 | 3.42 | 3.42 | 3.42 | 3.42 | 3.42 |
| ATMP, 50% | 1.11 | 1.11 | 1.11 | 1.11 | 1.11 | 1.11 | 1.11 |
| Potassium hydroxide, 45% | 1.1 | 1.1 | 1.1 | 1.1 | 1.1 | 1.1 | 1.1 |
| MGDA, granulate | 5 | 5 | 5 | 5 | 5 | 5 | 5 |
| Sodium citrate dihydrate | 2.5 | 2.5 | 2.5 | 2.5 | 2.5 | 2.5 | 2.5 |
| Mirapol Surf N ADW | 1 | 1 | 1 | 1 | 1 | 1 | 1 |
| Dehypon LS-36 | | 4 | | | | | |
| Dehypon LS-54 | | | 4 | | | | |
| Plurafac RA 300 | | | | 4 | | | |
| Plurafac LF 221 | | | | | 4 | | |
| Plurafac LF 403 | | | | | | 4 | |
| Plurafac SLF 180 | | | | | | | 4 |
| Esperase 6.OT | 1.9 | 1.9 | 1.9 | 1.9 | 1.9 | 1.9 | 1.9 |
| Sum | 100 | 100 | 100 | 100 | 100 | 100 | 100 |

As demonstrated in FIG. 6, the control formulation containing Mirapol Surf N ADW but no alcohol alkoxylate surfactant resulted in heavier filming in comparison to the formulations containing an alcohol alkoxylate surfactant. The formulations including Dehypon LS-36, Dehypon LS-54 and Plurafac RA 300 surprisingly resulted in effective reduction of filming in comparison to the control. The formulations containing Plurafac LF 221, Plurafac LF 403, and Plurafac SLF 180 did not result in a significant reduction from the control formulation. Particularly with respect to filming, Plurafac LF 221, Plurafac LF 403 and Plurafac SLF 180 provided little to no benefit in reducing filming in comparison to a composition not including any alcohol alkoxylate surfactant.

Therefore, the results demonstrate that the addition of an alcohol alkoxylate surfactant to a surface modification polymer results in a synergistic effect in not only improved rinsing, but also a reduction in filming. Without being limited to a particular mechanism or theory, the addition of an alcohol alkoxylate surfactant with a low amount of total moles of alkyl oxide provides superior reduction in filming, which is a problem associated with using a surface modification polymer on its own. In particular, it appears that incorporating an alcohol alkoxylate surfactant having less than 10 moles of alkyl oxide provided synergistic performance in combination with a surface modification polymer.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A method of cleaning and rinsing ware comprising:

contacting the ware with an alkaline detergent and rinsing composition comprising:

an alkalinity source;

a surface modification polymer comprising an acrylic acid/diallyldimethylammonium chloride (DADMAC) copolymer;

an alcohol alkoxylate nonionic surfactant;

a builder; and a water conditioning polymer;

rinsing the ware with water;

wherein no separate rinse aid composition is employed in the method, and wherein the alkaline detergent composition provides at least substantially similar cleaning and rinsing performance as separate detergent and rinse aid compositions.

2. The method of claim 1, wherein the alkalinity source is present from about 10 wt-% to about 95 wt-%; wherein the surface modification polymer is present from about 0.1 wt-% to about 5 wt-%; wherein the alcohol alkoxylate nonionic surfactant is present from about 0.1 wt-% to about 30 wt-%; wherein the builder is present from about 0.1 wt-% to about 50 wt-%; and wherein the water conditioning polymer is present from about 1 wt-% to about 50 wt-%.

3. The method of claim 1, wherein the alkaline detergent composition further comprises a neutralizing agent in an amount of between about 0.1 wt-% and about 10 wt-%.

4. The method of claim 3, wherein the neutralizing agent comprises up to about 10 wt-% of alkali metal hydroxide.

5. The method of claim 1, wherein the alkalinity source is substantially free of alkali metal hydroxide.

6. The method of claim 1, wherein the surface modification polymer is present from about 0.1 wt-% to less than 2 wt-%.

7. The method of claim 1, wherein the alkaline detergent composition is diluted to form a use solution prior to contacting the ware.

8. The method of claim 1, wherein the use solution has a pH of between about 9 and about 12.

9. The method of claim 1, wherein a use solution of the alkaline detergent composition has an active concentration between about 500 ppm to about 2000 ppm.

10. The method of claim 1, wherein the alkaline detergent composition provides substantially similar cleaning performance to a two part detergent and rinse aid composition that does not contain the surface modification polymer in combination with an alcohol alkoxylate, and wherein the alkaline detergent composition does not impart a visible layer or film on the treated ware.

11. The method of claim 1, wherein the alkaline detergent composition is a single use or a multi-use solid composition.

12. The method of claim 1, wherein the method is used in an undercounter warewash machine.

13. The method of claim 1, wherein the surface modification polymer further comprises a modified gum-based polysaccharide and/or an amphoteric polymer.

14. The method of claim 13, wherein the modified gum-based polysaccharide comprises a cationic guar or cationic guar derivative, or a hydroxypropyl-modified guar or hydroxypropyl-modified guar derivative.

15. The method of claim 1, wherein the alcohol alkoxylate nonionic surfactant is present from about 0.1 wt-% to about 25 wt-%.

16. The method of claim 1, wherein the alcohol alkoxylate is linear or branched, has a carbon chain between about 4 to about 20 carbons in length and has from about 5 moles to about 30 moles of alkyl oxide.

17. The method of claim 1, wherein the alcohol alkoxylate is linear, has a carbon chain between about 8 to about 16 carbons in length and has from about 5 moles to about 10 moles of alkyl oxide.

18. The method of claim 1, wherein the alcohol alkoxylate has less than 10 moles of alkyl oxide.

19. The method of claim 1, wherein the alkaline detergent composition is a solid and has a weight of between about 0.5 grams to about 250 grams.

20. The method of claim 1, wherein the alkaline detergent composition does not include a defoaming surfactant.

* * * * *